(12) United States Patent
Wang et al.

(10) Patent No.: US 10,671,679 B2
(45) Date of Patent: Jun. 2, 2020

(54) METHOD AND SYSTEM FOR ENHANCED CONTENT RECOMMENDATION

(71) Applicant: Yahoo Holdings, Inc., Sunnyvale, CA (US)

(72) Inventors: Chunming Wang, Beijing (CN); Jian Xu, San Jose, CA (US); Liang Wang, Beijing (CN); Yu Zou, Beijing (CN); Hao Zheng, Beijing (CN)

(73) Assignee: Oath Inc., New York, NY (US)

( * ) Notice: Subject to any disclaimer, the term of this patent is extended or adjusted under 35 U.S.C. 154(b) by 477 days.

(21) Appl. No.: 14/586,202

(22) Filed: Dec. 30, 2014

(65) Prior Publication Data

US 2016/0188725 A1    Jun. 30, 2016

(51) Int. Cl.
*G06F 16/9535* (2019.01)

(52) U.S. Cl.
CPC ................. *G06F 16/9535* (2019.01)

(58) Field of Classification Search
None
See application file for complete search history.

(56) References Cited

U.S. PATENT DOCUMENTS

| | | | |
|---|---|---|---|
| 9,055,343 B1 * | 6/2015 | Lewis | H04N 21/4826 |
| 2002/0178057 A1 * | 11/2002 | Bertram | G06Q 30/02 705/14.23 |
| 2003/0105682 A1 * | 6/2003 | Dicker | G06Q 30/02 705/26.8 |
| 2013/0013458 A1 * | 1/2013 | Uribe | G06Q 30/0201 705/26.64 |
| 2013/0103672 A1 * | 4/2013 | Parikh | G06F 17/30867 707/717 |
| 2013/0159331 A1 * | 6/2013 | Zhang | G06F 17/30241 707/758 |
| 2014/0100986 A1 * | 4/2014 | Linden | G06Q 30/02 705/26.7 |
| 2015/0095322 A1 * | 4/2015 | Procopio | G06Q 30/0631 707/723 |
| 2015/0248406 A1 * | 9/2015 | Walkingshaw | G06F 17/3089 707/748 |
| 2016/0140670 A1 * | 5/2016 | Gupta | G06Q 50/01 705/7.29 |

* cited by examiner

*Primary Examiner* — Tony Mahmoudi
*Assistant Examiner* — Umar Mian
(74) *Attorney, Agent, or Firm* — Pillsbury Winthrop Shaw Pittman LLP

(57) ABSTRACT

Method, system, and programs for providing content recommendation are disclosed. A first set of candidate content items may be generated based on a user profile, and a second set of candidate items may be generated based on the likelihood that the user will click a corresponding candidate content item in the second set. The candidate content items in the first and second sets may be ranked together using a learning model and presented to the user as content recommendations based on their rankings. The likelihood that the user will click a given candidate content item in the second set may be estimated based on similarities between the given content item and content items related to the given content item. Such a similarity may be computed based on activities performed by users who have viewed both the given content item and a related content item.

13 Claims, 18 Drawing Sheets

METHOD AND SYSTEM FOR ENHANCED CONTENT RECOMMENDATION

BACKGROUND

1. Technical Field

The present teaching relates to providing content. Specifically, the present teaching relates to methods and systems for providing online content.

2. Discussion of Technical Background

The Internet has made it possible for a user to electronically access virtually any content at any time and from any location. With the explosion of information, it has become more and more important to provide users with information that is relevant to the user and not just information in general. Further, as the Internet has become an important source of information for millions of users, including entertainment, and/or social connections, e.g., news, social interaction, movies, music, etc., it is critical to provide users with information they find valuable.

Efforts have been made to allow users to readily access relevant and on the point content. For example, topical portals have been developed that are more subject matter oriented as compared to generic content gathering systems such as traditional search engines. Example topical portals include portals on finance, sports, news, weather, shopping, music, art, film, etc. Such topical portals allow users to access information related to subject matters that these portals are directed to. Users have to go to different portals to access content of certain subject matter, which is not convenient and not user centric.

Another line of efforts to enable users to easily access relevant content is via personalization, which aims at understanding each user's individual likings/interests/preferences so that an individualized user profile for each user can be set up and can be used to select content that matches a user's interests. The underlying goal is to meet the minds of users in terms of content consumption. User profiles traditionally are constructed based on users' declared interests and/or inferred from, e.g., users' demographics. There have also been systems that identify users' interests based on observations made on users' interactions with content. A typical example of such user interaction with content is click through rate (CTR).

CTR may have been the most commonly used measure to estimate users' interests. However, CTR is not the only type of information adequate to capture information reflecting users' interests particularly given that other different types of activities that a user may perform may also indicate or implicate user's interests. In addition, user reactions to content usually represent users' short term interests. Such observed short term interests, when acquired in piece meal, as traditional approaches often do, can only lead to reactive, rather than proactive, services to users. Although short term interests are important, they may not be sufficient to reach an understanding of the more persistent long term interests of a user, which are crucial in terms of user retention. Most user interactions with content represent short term interests of the user so that relying on such short term interest behavior makes it difficult to expand the understanding of the increasing range of interests of the user. When this is in combination with the fact that such collected data is always the past behavior and collected passively, it creates a personalization bubble, making it difficult, if not impossible, to discover other interests of a user unless the user initiates some action to reveal new interests.

Yet another line of effort to allow users to access relevant content is to pooling content that may be of interest to users in accordance with their interests. Given the explosion of information on the Internet, it is not likely, even if possible, to evaluate all content accessible via the Internet whenever there is a need to select content relevant to a particular user. Thus, realistically, it is needed to identify a subset or a pool of the Internet content for individual users or a subgroup of users who share interests based on some criteria so that content can be selected from this pool and recommended to users based on their interests for consumption.

Conventional approaches to creating such a subset of content are application centric. Each application carves out its own subset of content in a manner that is specific to the application. For example, Amazon.com may have a content database related to products and information associated thereof created/updated based on information related to its own users and/or interests of such users exhibited when they interact with Amazon.com. Based on knowledge about individual users, Amazon.com may generate a pool for each user based on their purchasing preferences. Facebook may also have its own subset of content, generated in a manner not only specific to Facebook but also based on user interests exhibited while they are active on Facebook. As a user may be active in different applications (e.g., Amazon.com and Facebook) and with each application, they likely exhibit only part of their overall interests in connection with the nature of the application. Given that, each application can usually gain understanding, at best, of partial interests of users, making it difficult to develop a subset of content that can be used to serve a broader range of users' interests.

Yet another line of effort is directed to personalized content recommendation, i.e., selecting content from a content database based on the user's personalized profiles and recommending such identified content to the user. Conventional solutions focus on relevance, i.e., the relevance between the content and the user's past interests. For example, a user's profile indicating a set of features (e.g., terms, phrases, topics, categories) of content viewed by the user in the past is typically extracted for comparison with the features in the contents. However, such relevance based content recommendation techniques are limited in that they require feature extraction from both the user profile and contents to be accurate so that features in the contents may be matched to the features in the user profile for recommendation.

Another line of effort is directed to recommending contents based on user activity information. For example, some conventional systems analyze user activities and generate a bipartite graph indicating whether users viewed certain content items. For instance, an edge may be established in the bipartite graph between user A and content item A to indicate user A viewed content item A, another edge may be established in the bipartite graph between user A and content item C to indicate user A viewed content item C, a third edge may be established in the bipartite graph between user B and content item C to indicate user B viewed content item C, and so on. Based on this bipartite graph, these systems may recommend content item C to a given user who viewed content item A because user A, who is deemed to be similar to the given user by those systems, viewed content items A and C. To these systems, user A's viewing of content items A and C correlates the given user's interest and thus content item C should be recommended to the user after the given user viewed content item A. However, such an approach is limited because the bipartite graph may not accurately capture user A's interest. For example, lacking of an edge between user A and a content item, say content item D, does not necessarily mean user A is not interested in content item D. There could be a number of other reasons why user A did not view content item D—for example, content item D may not have been even presented to user A or user A may not have discovered content item D. As another example, the edge between user A and content item C indicating user A viewed content item C may also not necessarily mean user A is interested in content item C. For instance, user A may have viewed content item C merely for a quick overview and decides content item C is not of interest to him/her-self. On the other hand, other user activities such as user click activities during viewing of the content items may provide further insights into user interests in content items. They may be used to enhance and enrich the conventional user-activity based content recommendation approach.

Accordingly, there is at least a need to enhance conventional content recommendation techniques.

SUMMARY

The present teaching relates to providing content. Specifically, the present teaching relates to methods and systems for providing online content.

In one example, a method, implemented on a machine having at least one processor, storage, and a communication platform connected to a network, for presenting providing content recommendations.

In accordance with the present teaching, for recommending content items to a user, a first set of candidate content items may be generated based on a user profile, and a second set of candidate items may be generated based on the likelihood that the user will click a corresponding candidate content item in the second set. The candidate content items in the first and second sets may be ranked together using a learning model and presented to the user as content recommendations based on their rankings.

For generating the first set of candidate content items for recommendation to the user, information in the user's profile indicating content features that have been viewed by the user may be obtained. The number of times the user has viewed a particular one of these content features may be compared with average number of times other users have viewed that content feature. Such a comparison may be carried out for each content feature that has been viewed by the user. The content features that have been viewed by the user may then be ranked based on the results of such comparisons. A number of content features that have been viewed by the user may be selected based on their rankings to reflect the user's interest in content features. The first set of the candidate content items may be generated from a content storage based on the number of selected content features.

For generating the second set of candidate content items, the likelihood that the user will click a given candidate content item may be estimated based on similarities between the given content item and content items related to the given content item and viewed by the user previously. A similarity between the given content item and a related content item may be generated based on activities performed by users who have viewed both the given content item and the related content item. The user activities may include clicking, typing, scrolling, dwelling, forwarding, commenting, and/or any other types(s) of activities by those users during viewing of the given content item and the related content item. In implementations, for computing such a similarity, a user activity vector for the given candidate content item may be generated. The values of the generated user activity vector may indicate weighted user activities performed by corresponding users during viewing of the given candidate content item. A user activity vector for the related content item may be similarly generated. The similarity between the given candidate content item and the related content item may be estimated by comparing the two user activity vectors. Similarities between the given candidate content item and each related content item may be estimated in this fashion and aggregated. Based on the aggregated similarities between the given candidate content item and the related content items and whether the user has clicked the related content items, the likelihood that the user will click the given candidate content item may be determined. If the likelihood is high enough, the given candidate content item may be included in the second set of candidate content items.

The candidate content items in the first and second sets may be ranked together using a learning model. In some implementations, the learning model may be trained using user information, content information, user-content cross information, and/or any other type(s) of information. Candidate content items in the first and second sets may be presented to the user as content recommendations based on their rankings determined using the learning model.

Other concepts relate to software for implementing the enhanced content recommendations. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for recommending content items, where when the information is read by the machine, causes the machine to obtain a user profile characterizing interests of the user; generate a first set of candidate content items based on the user profile; generate a second set of candidate content items based on a likelihood that the user clicks a corresponding candidate content item in the second set, wherein each likelihood is estimated based on similarities between the candidate content items in the second set and one or more content items that were previously viewed by the user; rank each of the candidate content items in the first set and the second set; and provide, based on the rankings, the candidate content items in the first and second sets as content recommendations to the user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
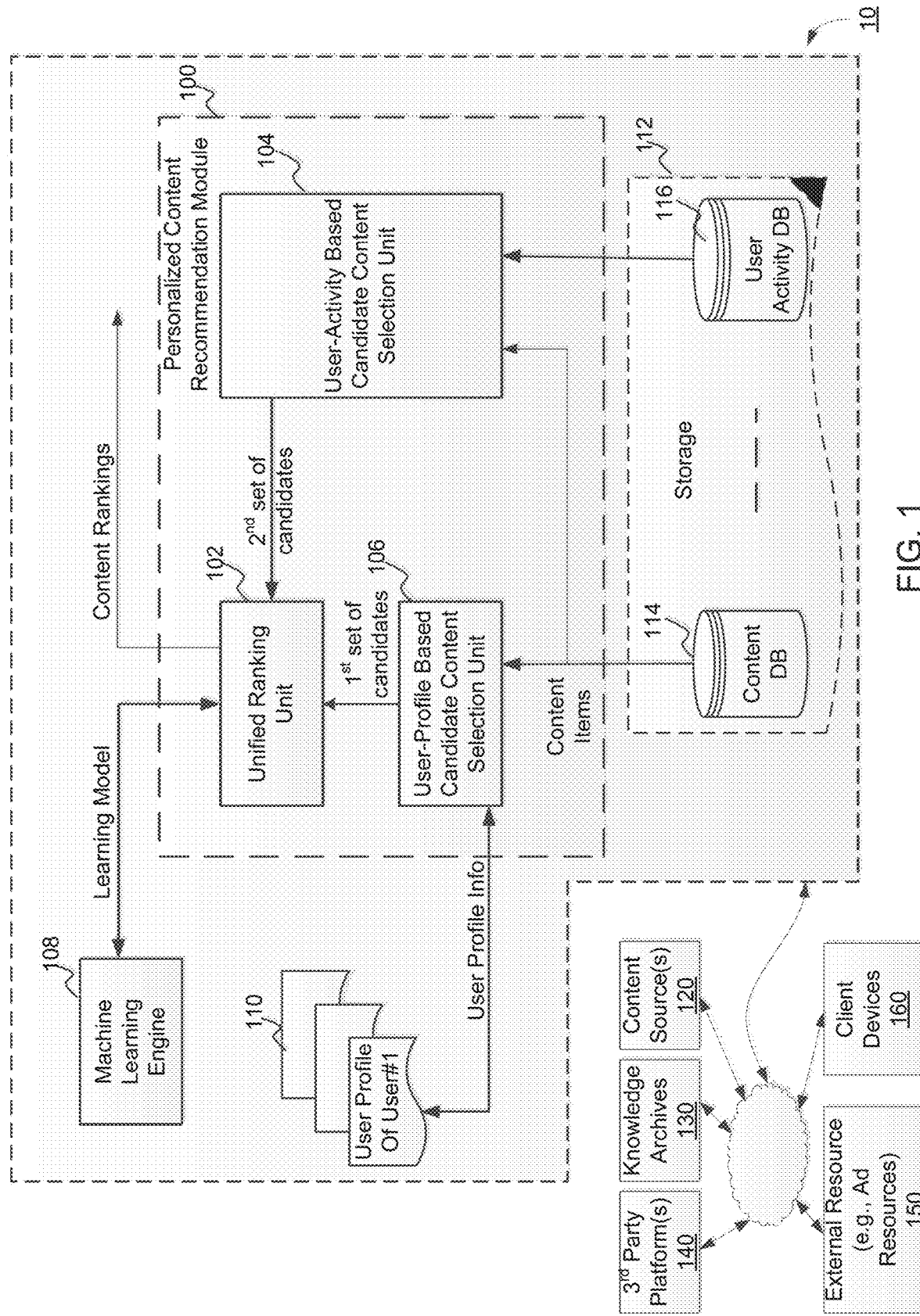
FIG. 1 depicts an exemplary system for personalized content recommendation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to recommending on-line content to a user. Particularly, the present teaching relates to a system, method, and/or programs for personalized content recommendation that addresses the shortcomings associated the conventional content recommendation solutions in personalization, content database, and recommending personalized content. The present teaching may be realized as a specialized and networked system by utilizing one or more computing devices (e.g., mobile phone, personal computer, etc.) and network communications (wired or wireless).

In accordance with the present teaching, a first set of candidate content items may be generated based on a user profile. The user profile may comprise information indicating content features that have been viewed by the user. The individual content features in the user profile may be ranked by comparing a number of times the user viewed a corresponding content feature and an average number of times this content feature was viewed by a general population of users. A number of content features may be selected based on the rankings of the content features. Based on the selected content features, the first set of candidate content items may be generated for recommendation to the user.

In accordance with the present teaching, a second set of candidate items may be generated based on the likelihood that the user will click a corresponding candidate content item in the second set. In some implementations, the likelihood that the user will click a given candidate content item may be estimated based on similarities between the given candidate content item and related content items that were viewed by the user previously. A similarity between the given candidate content item and a related content item may be generated based on activities by users who have viewed both the given candidate content item and the related content item. The activities may include clicking, typing, scrolling, dwelling, forwarding, commenting, and/or any other types(s) of activities by those users during viewing of the given candidate content item and the given related content item. In implementations, for computing such a similarity, a user activity vector for the given candidate content item may be generated having various weights associated with corresponding activities that were performed by corresponding users during viewing of the given candidate content item. A user activity vector for a given related content item may be similarly generated. The similarity between the given candidate content item and a related content item may then be computed by comparing the two user activity vectors. The similarities between the given candidate content item and related content items may be aggregated. The likelihood that the user will click the given candidate content item may be determined based on the aggregated similarities and whether the related content items were clicked by the user. If the likelihood is high enough, the given candidate content item may be included in the second set of candidate content items.

After the first and second sets of candidate content items are generated, in accordance with the present teaching, the candidate content items in the first and second sets may be ranked. In some examples, a learning model may be used to rank the candidate content items in the first and second sets. The learning model may be trained using a set of training data including user features, content features, user-content cross features, and/or any other features. These features may be gathered and fed into the learning model to train the learning model. The trained learning model may then be used to rank the candidate content items in the first and second sets for presentation to the user.

FIG. 1 depicts an exemplary system 10 for personalized content recommendation, according to an embodiment of the present teaching. As shown in this example, system 10 may comprise a personalized content recommendation module 100, a machine learning engine 108, storage 112, and/or any other components. As shown, system 10 may be operatively connected to or include content source(s) 120, knowledge archives 130, third party platform(s) 140, and external resources 150. Content source(s) 120 may include any source of on-line content such as on-line news, published papers, blogs, on-line tabloids, magazines, audio content, image content, and video content. Examples of contents provided by content source(s) 120 may include contents from content provider such as Yahoo! Finance, Yahoo! Sports, CNN, and ESPN; may include textual, multi-media contents and/or any other form of content suitable for user interaction or viewing via the world wide web; may include social media contents accessible on a social media site, such as Facebook, twitter, Reddit, and/or or any other social media site; may include licensed contents from providers such as AP and Reuters; may include contents crawled and indexed from various sources on the Internet; and/or may include any other types of contents. Content sources 120 provide a variety of content to system 10 for providing personalized content recommendation. It is understood that content sources 120 may include sources of contents that are not necessarily accessible via Internet. For example, content sources 120 may include sources of contents accessible via a local communication network, such as an intranet.

Knowledge archives 130 may include any depository of knowledge related information, including an on-line encyclopedia such as Wikipedia or indexing system such as an on-line dictionary. Knowledge archives 130 may be utilized for its content as well as its categorization or indexing systems. Knowledge archives 130 may provide classification system to assist with the classification of both the preferences of user as well as classification of content. Knowledge archives 130, such as Wikipedia may have hundreds of thousands to millions of classifications and sub-classifications, which may be organized in hierarchies. Those classifications may be used by system 10 to determine or select personalized content to be recommended to a user. For example, they may help system 10 to understand how one category of contents relates to another category of contents. They may help system 10 to maneuver between higher levels on the hierarchy without having to move up and down the subcategories. The categories or classification structure in Knowledge archives 130 may be used for constructing multidimensional content vectors and multidimensional user profile vectors, which may be utilized by personalized content recommendation module 100 to match personalized content.

The third party platform(s) 140 may include any platform provided by a third party service provider affiliated with, e.g., the system 10. Examples of third party platforms may include, but not limited to, social networking sites like Facebook, Twitter, LinkedIn, Google+, mail servers such as Gmail, online community such as America Online, and/or any other type(s) of third party platform(s). Third party platforms 140 may provide system 10 contents as well as information that may be utilized to understand insights of user preferences and behaviors. Such insights may be used to help system 10 to recommend personalized content to individual users. As illustration, without limitation, information from a third party platform on user activities performed on the third party platform may reveal users' interests exhibited on the third party platform, content that the users consumed on the third party platform, and/or any other user information from the third party platform that may be used to enhance the personalization of content stream provided to a particular user of system 10. For example, when information about a large user population can be accessed from one or more third party platforms 140, system 10 can rely on data about a large population to establish a baseline interest profile to estimate the interests of individual users more precise and reliable, e.g., by comparing interest data with respect to a particular user with the baseline interest profile which will capture the user's interests with a high level of certainty.

External resources 150 may provide various types of content to system 10, including but not limited to, streaming contents, static contents, and sponsored contents. External resources 150 may include any party associated with an advertising entity that is associated with system 10. Such an external resource may provide content to be included in the recommendation to a user, including, but not limited to, advertisements from an advertisement content database (not shown), information related to target audience for each advertisement, and/or information related to advertisement taxonomy that may be used to identify advertisement in appropriate categories. Advertising contents may be presented either as a part of a content stream or a standalone advertisement such as a pop-up window, and can be placed either according to a designated ad-space or strategically around or within the associated content stream. In some implementations, appropriate advertising content may be selected by the personalized content recommendation module 100 in order for it to be inserted into a content stream. The personalization of advertising content may be based on a variety types of information such as user profile 110 or user activities. In some implementations, content taxonomy, advertisement taxonomy, and user information, including user profile or activities, may all be used to determine appropriate advertisement given the content related to certain subject matter to be presented to a specific user that has certain preferences.

In some implementations, system 10 may be configured to identify and/or process contents from content source(s) 120, knowledge archives 130, $3^{rd}$ party platforms 140, and/or external resources 150 for identifying personalized content recommendations to user. For instance, when new content is identified from content source 120 or third party platform(s) 140, system 10 may be configured to analyze the new content to understand concepts or subject matter embodied in the new contents. Such obtained concepts can be mapped to one or more categories in a content taxonomy (not shown) associated with system 10. The content taxonomy may include an organized structure of concepts or categories of concepts and it may contain a few hundred classifications of a few thousand. In addition, the knowledge archives 130 may also provide millions of concepts, which may or may not be structured in a similar manner as the content taxonomy. The content taxonomy and, in some examples, the knowledge archives 130 may be used as a universal interest space. Concepts estimated from the new content can be mapped to this universal interest space and a high dimensional content feature vector may be constructed for the new content and used to characterize the new content. Similarly, for a user, a personal interest profile may be constructed, mapping the user's interests, characterized as concepts, to the universal interest space so that a high dimensional user feature vector can be constructed with the user's interests levels populated in the general vector.

The personalized content recommendation module 100 may be configured to provide personalized content to a user. In some implementations, operation(s) of personalized content recommendation module 100 may be triggered when the user engages system 10 through a client device 160 associated with user. Client device 160 may include a smart phone, a tablet, a laptop computer, a desktop computer, a wearable device, an embedded computing device (such as in a car), a game console, a set-top box, a printer, or any other type of client device. User information includes, e.g., user id, login information, session information, user activity information (e.g., click, typing, browsing, and/or any other type user activities), or search information (e.g., search terms entered by the user to system 10). Some user information reflects user's interests. Information related to any other user may also be received from the client device 160 operated by such users so that interests of a group of users may also be collected and utilized. User may interact with system 10 via any suitable communications channel including a wired link and/or a wireless link. The user information received from user devices 160 may be utilized by the personalized content recommendation module 100 to locate content that is customized with respect to individual users for recommending to the users on their respective client device 160. In various implementations, the personalized content recommended to the user may include personalized content stream presented in an application running on the client device 160.

In some implementations, as shown in this example, the personalized content recommendation module 100 may include a unified ranking unit 102, a user activity-based candidate content selection unit 104, a user-profile based candidate content selection unit 106, a machine learning engine 108, and/or any other appropriate components. As shown, the user-profile based candidate content selection unit 106 may be configured to identify content appropriate for the user based on the profile related to the user. In operation, the user-profile based candidate content selection unit 106 receives a user profile 110 of a user (user #1 in this example) and various content items from a content database 114 in the storage 112 as inputs. The user-profile based candidate content selection unit 106 may be configured to generate a first set of candidate content items based on these inputs.

The user-activity based candidate content selection unit 104 may be configured to identify appropriate content for a user based on activities of the user. In operation, the user-activity based candidate content selection unit 104 may receive information related to user activities, e.g., from the user activity database 116 and select a second set of candidate content items from the content database 114 that are deemed as appropriate given the observed user activities. The unified ranking unit 102 may be configured to receive the first and second candidate content items (from the user-profile based candidate content selection unit 106 and user-activity based candidate content selection unit 104, respectively), and rank the content items received based on a learning model provided by the machine learning engine 108. As will be described later, the machine learning engine 108 may be configured to train learning model(s), which may be used by the unified ranking unit 102 to rank the candidate content items in the first and second sets content items to be recommended to a user.

Storage 112 may be configured to store various types of information that may be used to assist personalized content recommendation module 100 to provide personalized content recommendations. As shown in this example, storage 112 may include, but is not limited to, a content database 114 configured to store information related to content items, and a user activity database 116 configured to store information related to user activities. Content database 114 may include content items that can be presented to the users and/or Meta information associated therewith. For example, content items may include, but not limited to, articles, movies, music clips, photos, animation, sounds, games, interactive applications (e.g., java applets), contents in an app on a portable device, virtual reality contents, and/or any other type of content items. In some implementations, the content database 114 may be structured so that it may store personalized content pool for individual users. In this case, content items in the content pool may be generated and retained with respect to individual users. In implementations, the content pools in content database 114 may be organized as a tiered system with both the general content pool and personalized individual content pools for different users. In some implementation, in a content pool for a user, the content items itself may not be physically present but is operational via links, pointers, or indices which provide references to where the actual content is stored in the general content pool.

Content database 114 may be dynamically updated by system 10. Content item in the content database may come and go and decisions may be made based on the dynamic information of the users, the content itself, as well as other types of information. For example, without limitation, when the performance of content deteriorates, e.g., low level of interests exhibited from users, system 10 may decide to purge it from the content database 114. When content becomes stale or outdated, it may also be removed from the content database 114. When there is a newly detected interest from a user, system 10 may fetch new content aligning with the newly discovered interests and then update the content database 114 by, e.g., insert the content into a relevant content pool in the database 114.

The user activity database 116 may be configured to store information related to activities that user conducted. User events may be an important source of observations as to content performance and user interest dynamics. Information of user activities may be analyzed by system 10 in determining inferred user interests or dynamics of the user interests. When new interests are identified for a user, content appropriate for the new interests may be identified and used to update content database 114. When fetching new content (e.g., from content sources 120, knowledge archives 130, $3^{rd}$ party platform(s) 140, and/or external resources 150), system 10 may invoke a content crawler (not shown in this example) to gather new content, which may then be analyzed and evaluated as to its quality and performance before system 10 decides whether it will be included in the content pool associated with the user in the content database 114. Content may also be removed from content database 114 when it is no longer relevant, e.g., either because other users are not considering it to be of high quality or because it is no longer timely. As content is constantly changing, updating content database 114 may also be performed constantly or dynamically to change or update the content database 114 so that potentially high relevant, high quality, and timely content can be made available to the personalized content recommendation module 100 for recommendation.

The user activity database 116 may be configured to store different types of user activity information in connection with the content items stored in the content database 114. Examples of user activity information that may be stored in the user activity database 116 may include information indicating scroll activities, scroll time, overall dwell time, dwell time by sections in the given content item, links clicked, position clicked, typing activities, and/or any other activity information indicating various aspects how users viewed and/or interacted with a given content item. For example, the user activity information corresponding to a given content item may indicate user activities engaged by one or more of users during viewing of the given content item. As an illustration, without limitation, the user activity information corresponding to the given content item may include information indicating a first number of specific users that have viewed the given content item, a second number of specific users that have viewed and clicked the given content item, and a third number of specific users that have not viewed given content item. For those users who have viewed the given content item, the user activity information may include information indicating scroll activities, scroll time, overall dwell time, dwell time by sections in the given content item, links clicked, position clicked, typing activities, and/or any other activity information indicating various aspects how the users viewed and/or interacted with the given content item.

With system 10 having been generally described above, various aspects of personalized content recommendation module 100 will now be described with reference to FIGS. 2-12.

Figure 2:
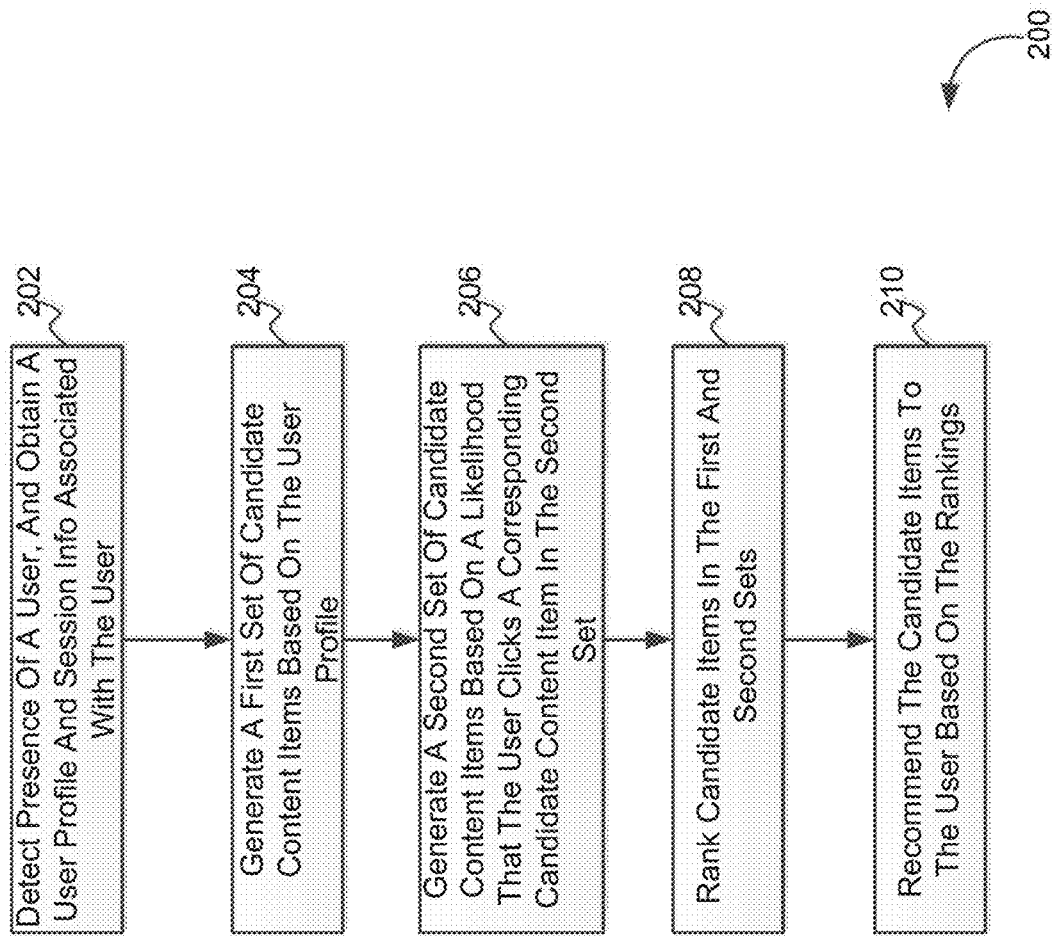
FIG. 2 is a flowchart of an exemplary process for providing content recommendation, according to various embodiments of the present teaching.

FIG. 2 is a flowchart of an exemplary process 200 for providing content recommendation, according to various embodiments of the present teaching. As shown, at 202, presence of a user may be detected, and a user profile as well as session information associated with the user may be obtained. The user profile obtained at 202 may include information indicating content features that have been viewed in the past by the user. For example, such content features in the user profile may include phrases, keywords, specific content identification (e.g., a title of the content item), content topics, content categories and/or any other content features that have been viewed by the user in the past. In some implementations, these features may be indexed in accordance with the frequencies at which the user has viewed them. As an illustration, a given user profile obtained at 202 may indicate that the use has viewed contents related to sports (e.g., a topic or category) most often in the past, content items related to finance second most often in the past and so on. As another illustration, the given user profile obtained at 202 may indicate the user has viewed content items containing keywords "LeBron James" most often in the past, and contents containing keywords "Cleveland city council" second most often, and so on. The user session information obtained at 202 may include information indicating one or more content items that have been viewed by the user in a session or sessions engaged by the user (e.g., the current session and/or a number of historical sessions).

At 204, a first set of candidate content items may be generated based on the user profile obtained at 202. The first set of candidate content items may be generated based on content items stored in the content database. The first set of candidate content items at 204 may be determined based on considerations, e.g., whether the content item relates to the user's interests according to the user profile. The interests of a user as recorded in the user profile may be determined based on, e.g., declared interests and/or interests that are inferred for the user based on, e.g., user activities observed.

At 208, a second set of candidate content items may be selected from the content database 114 based on information related to user activities. For example, based on activities of a user on various content items previously presented to the user, the likelihood that the user will be interested in a candidate content item may be estimated. The higher the likelihood estimated, a higher possibility that the user will like to content item. In operation, to select a candidate content item in the second set, system 10 may perform the following: for each candidate content item in the content database, determining a set of related content items that are related to the candidate content item and that have been previously presented and viewed by the user; determining a similarity between the candidate content item and each related content item; weighting clicking or non-clicking event by the user during viewing of each related content item with the corresponding similarities; computing the likelihood that the user will click the candidate content item based on aggregation of the weighted clicking or non-clicking events by the user divided by total number of viewing of the related content items by the user; and including the candidate content item in the second set of candidate content items based on the likelihood of the candidate content item (e.g., if it exceeds a predetermined threshold).

At 210, the candidate content items in the first and second sets, as determined at 204 and 208 respectively, may be ranked. In some implementations, operation(s) at 210 may involve ranking the candidate content items in the first and second sets using a learning model.

At 212, the candidate content items may be presented to the user as content recommendations based on their rankings determined at 210.

Figure 3:
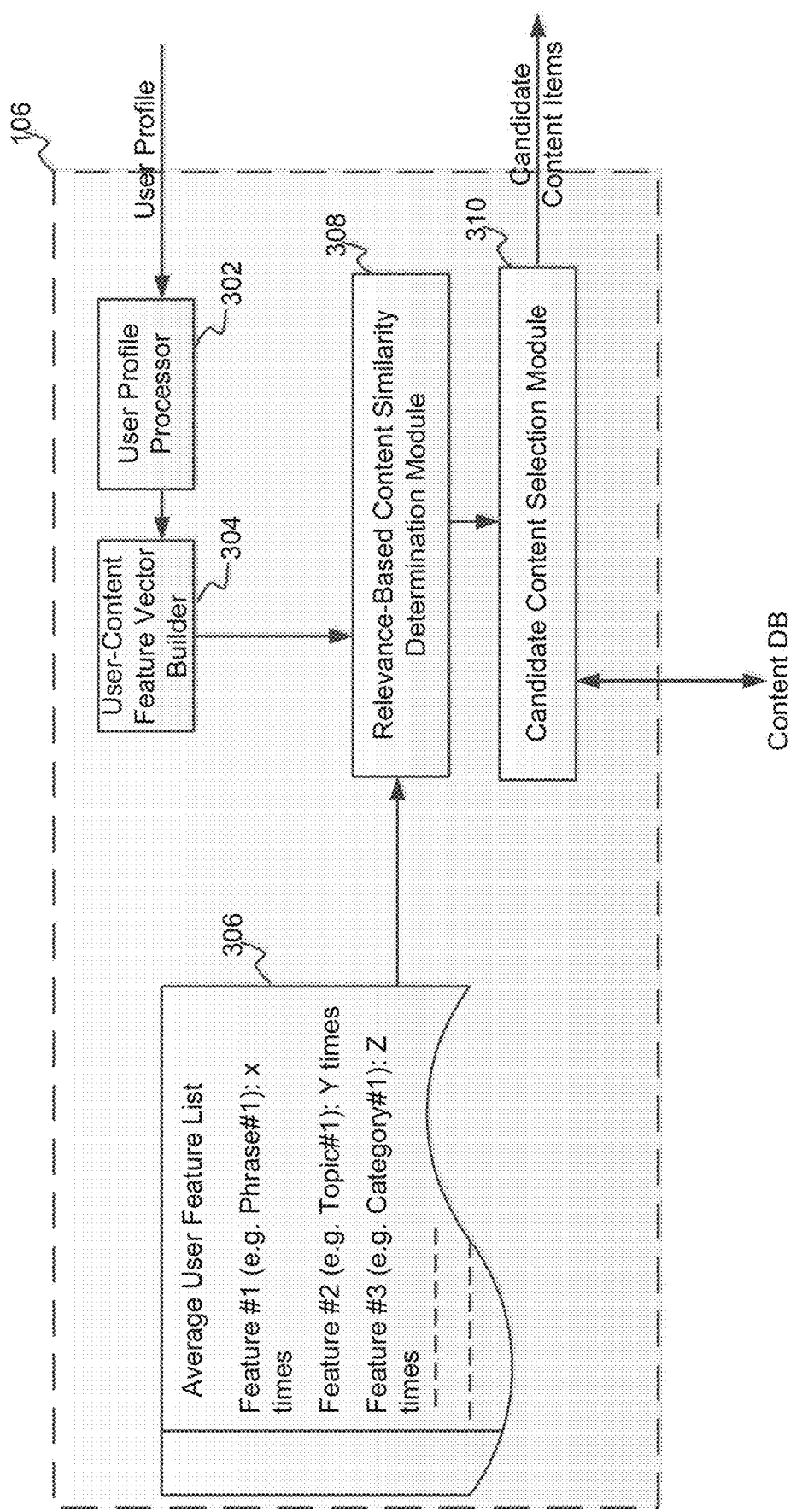
FIG. 3 illustrates one example of the user-profile based candidate item selection unit shown in FIG. 1, according to an embodiment of the present teaching.

FIG. 3 illustrates an example of the user-profile based candidate content selection unit 106 shown in FIG. 1. It will be described with reference to FIGS. 1-2. As shown in this example, the user-profile based candidate content selection unit 106 may be configured to include a user profile processor 302, a user-content feature vector builder 304, a relevance-based content similarity determination module 308, a candidate content selection module 310, and/or any other module. As shown, the user profile processor 302 may be configured to receive a user profile associated with a user. Such a user profile may include declared interests of the user or inferred interests of the user. The inferred interests of the user may be represented using a feature vector constructed based on, e.g., keywords, phrases, topics, categories, or any other feature associated with content items viewed by the user previously. This feature vector may be constructed based on, e.g., user's activities on the content items previously viewed and acted on. This feature vector may represent inferred interests of the user captured by the values in the vector against different attributes. In some embodiments, the feature vector representing the inferred user interests may be stored in the user profile. In other embodiments, such a feature vector related to inferred user interests may be stored elsewhere and input to system 10 from a third party vendor (now shown).

The user profile processor 302 may be configured to forward the user profile (and the feature vector representing user's inferred interests) to the user-content feature vector builder 304. The user-content feature vector builder 304 may then build a user-content feature vector for the given user. The user-content feature vector built by the user-content feature vector builder 304 may contain components, each of which may indicate that a particular user feature has been viewed by the given user for a corresponding number of times. Such a user-content feature vector is then sent to the relevant-based content similarity determination module 308. As illustrated, the relevance-based content similarity determination module 308 may be configured to determine the similarity between a content item and the user's interests. For example, when the relevance-based content similarity determination module 308 receives the user-content feature vector from the user-content feature vector builder 304, it may also receive a feature vector 306 that provides the average interest of all users with respect to this content item. The average user feature list may be prepared and/or updated based on, e.g., features collected from observations made on all users. This average user feature list may be offline or dynamically trained. As illustrated, the average user feature list 306 may contain entries indicating features contained in content items (keywords, phrases, topics, etc.) that have been viewed by different users in the past within, e.g., a certain period of time. The average features may be determined based on, e.g., the total number of times being viewed by a user divided by the number of users who have viewed the content item. Based on the average user feature list 306 and the user-content feature vector, the relevance-based content similarity determination module 308 may determine, for each feature, a relative score of the user as compared to the average score from a group of users. The relative score for each feature may be a ratio or any other form that indicates how much the feature from the user deviates from the feature from the group of users representing, e.g., the general population. When the feature from the user is significantly higher than that of the general population, it may be considered that the user is interested in content items that are associated with the feature. A set of features may be selected to guide how to proceed to identify content items that exhibit the features that are ranked high in comparison with the general population.

Based on the results from the relevance-based content similarity determination module 308, the candidate selection module 310 selects, from the content database, content items that have the features that are ranked high by the relevance-based content similarity determination module 308. For example, the candidate selection module 310 may be configured to select content items that contain top features ranked based on the relative scores determined by the relevance-based content similarity determination module 308.

Figure 4:
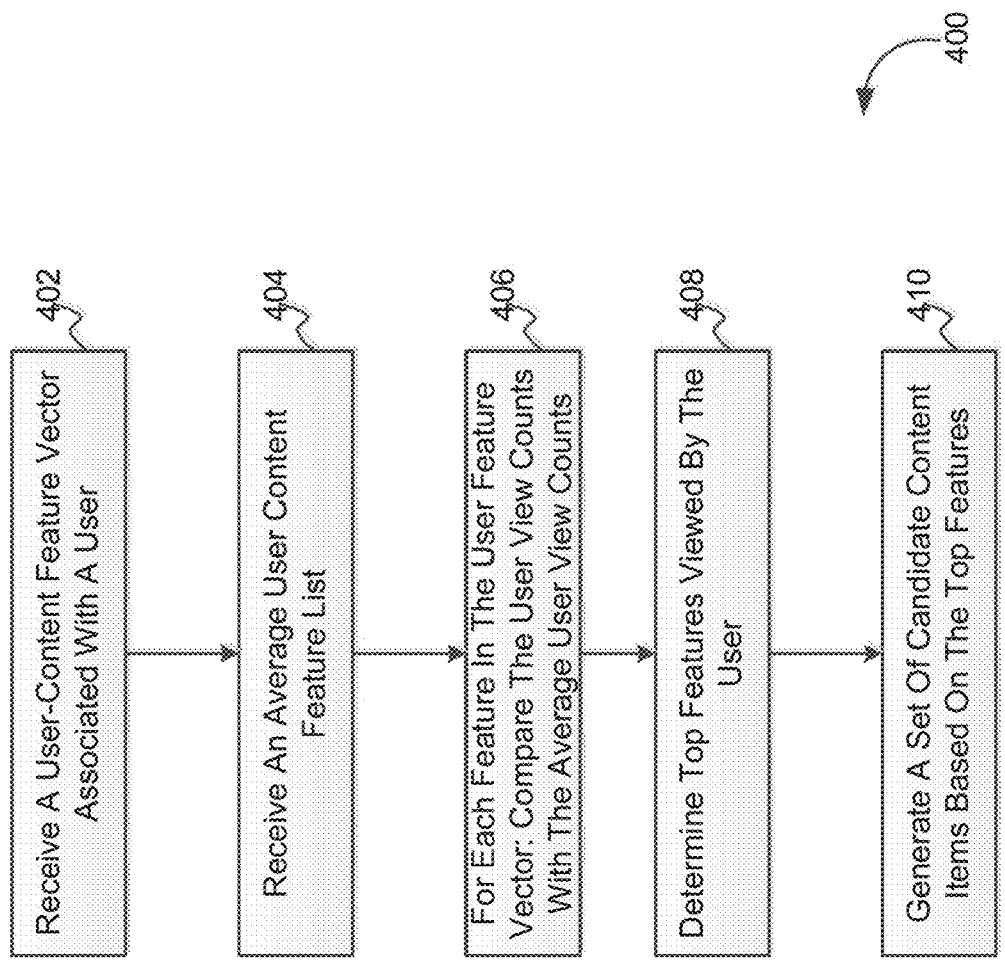
FIG. 4 illustrates an exemplary method that may be implemented by the relevance-based content similarity determination module shown in FIG. 3, according to various embodiments of the present teaching.

FIG. 4 illustrates an exemplary method 400 that may be implemented by the relevance-based content similarity determination module 308 shown in FIG. 3. As shown, at 402 a user-content feature vector associated with a user may be received. The user-content feature vector received at 402 corresponds to a vector for the user constructed based on observation on the behavior of the user. The user-content feature vector may include various attributes or features or components, each of which corresponds to a feature that may occur in content. For example, a feature can be a word, a phrase, or any other features observed from content. Each attribute may have a value which may indicate a number of times a corresponding content including the attribute or feature has been viewed by the user. At 404, an average user content feature list may be received. The average user content feature list received at 404 corresponds to a user-content feature vector constructed based on observations made on a group of users representing the general population of users. The average user-content feature list may comprise attributes, each of which indicates a number of times content including the corresponding feature has been viewed by the general population (represented by a group of users based on which the average user-content feature list is constructed).

At 406, for each feature in the user-content feature vector, the corresponding number of times the user has viewed content including the feature may be compared with the corresponding average number of times a user from the general population has viewed content with that feature. As an illustration, assuming a user-content feature vector) $(f_1 \ldots f_i \ldots f_n)$ which has attribute or feature values $(t_1 \ldots t_i \ldots t_n)_u$, respectively, indicating that the user has viewed content including feature $f_1$ in $t_1$ times, viewed content including feature $f_2$ in $t_2$ times, . . . etc. In some examples, the operation(s) at 406 may involve normalizing $(t_1 \ldots t_i \ldots t_n)_u$ to $(w_1 \ldots w_i \ldots w_n)_u$. This may be done by dividing ti with the summation of $(t_1 \ldots t_i \ldots t_n)$. In an average user-content feature list, there are corresponding features and feature values, representing the average number of times the general population has viewed content with each particular feature. The attribute values in the average user-content feature list may also be normalized. Then the operation(s) at 406 may divide each $w_i$ in the user-content feature vector by the average value for the corresponding feature, i.e., $avg(w_i)$ in the average user content-feature list to get a sense the strength of the user interests in content including each particular feature as compared with the interests in the same features from an average user.

At 408, top features may be determined for the user based on the comparison at 406. The more the features value of the user deviates from that of an average user, more likely it is that the user has a particular interest in content including that feature. At 410, a set of candidate content items may be generated based on the top features for the user as determined at 408. For example, a set of top features may be determined by selecting those features which have features values that are the most significantly higher than that of the corresponding feature values from the average user-content feature list. Such identified top features may then be used to guide how content is selected from the content database that are deemed to most likely meet the interests of the user. Operation(s) at 410 may include querying the content from the content database using the selected top features as key or index to retrieve contents considered to be most relevant to the user interests.

Figure 5:
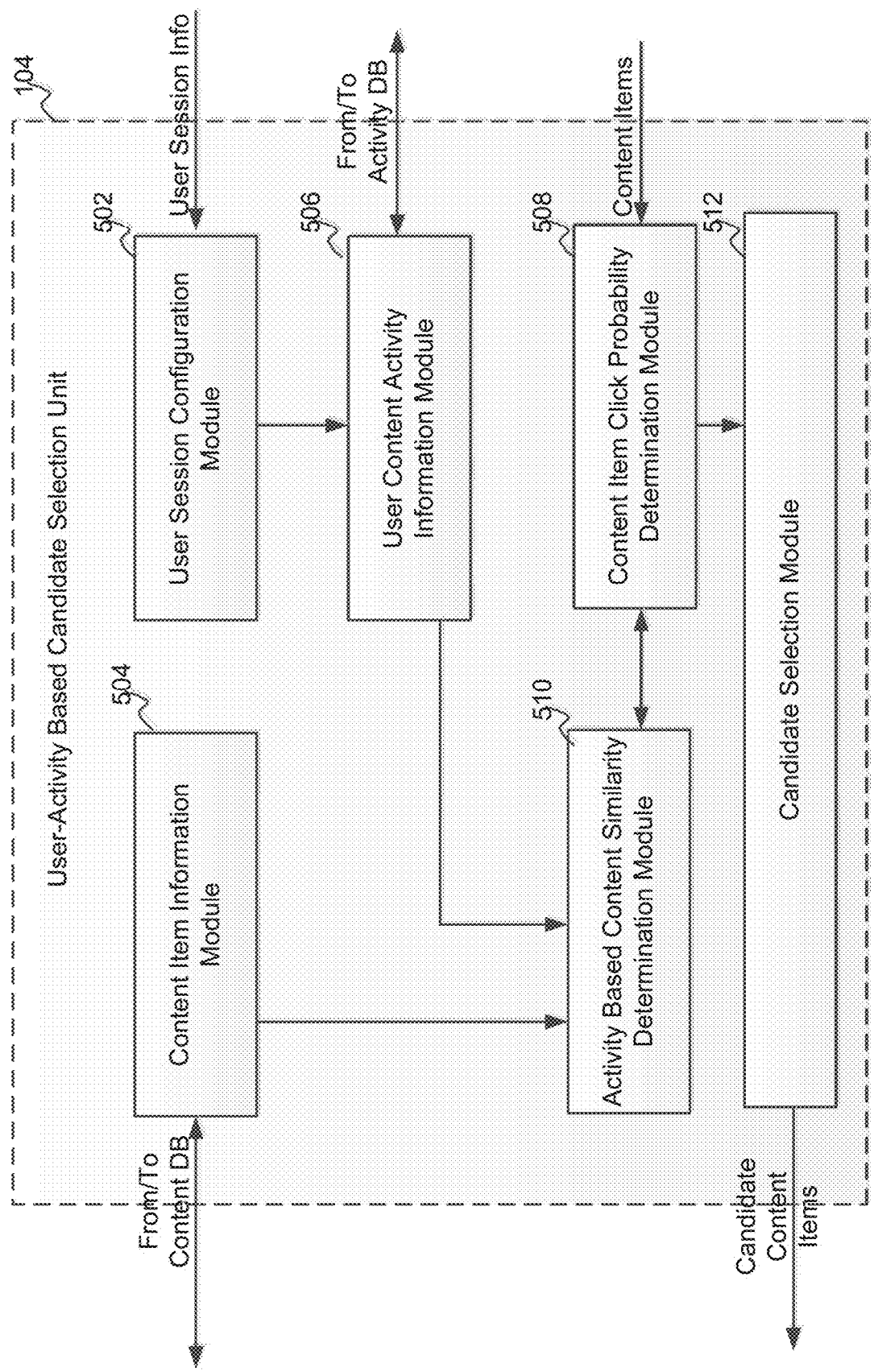
FIG. 5 illustrates one example of a user-activity based candidate item selection unit shown in FIG. 1, according to an embodiment of the present teaching.

FIG. 5 illustrates one example of a user-activity based candidate content selection unit 104 shown in FIG. 1. It will be described in connection with FIG. 1. As shown in this example, the user-activity based candidate content selection unit 104 may be configured to include a user session configuration module 502, a content item information module 504, a user content activity information module 506, an activity based content similarity determination module 510, a content item click probability determination module 508, a candidate selection module 512, and/or any other modules. As illustrated herein, the user session configuration module 502 may be configured to receive user session information regarding one or more user sessions associated with a given user. Based on the user session information received, the user session configuration module 502 may determine one or more content items that were viewed by the user during these user sessions. For example, the user session information received may indicate that the user has viewed 4 content items in a user session or that the user has reviewed 7 content items in 3 user sessions. Accordingly, the user session content determination module 502 may identify those content items viewed by the user and forward these content items or identification information thereof to the content item information module 504.

The content item information module 504 may be configured to retrieve such content items and/or information thereof from the content database, such as the content database 114 shown in FIG. 1.

Figure 6:
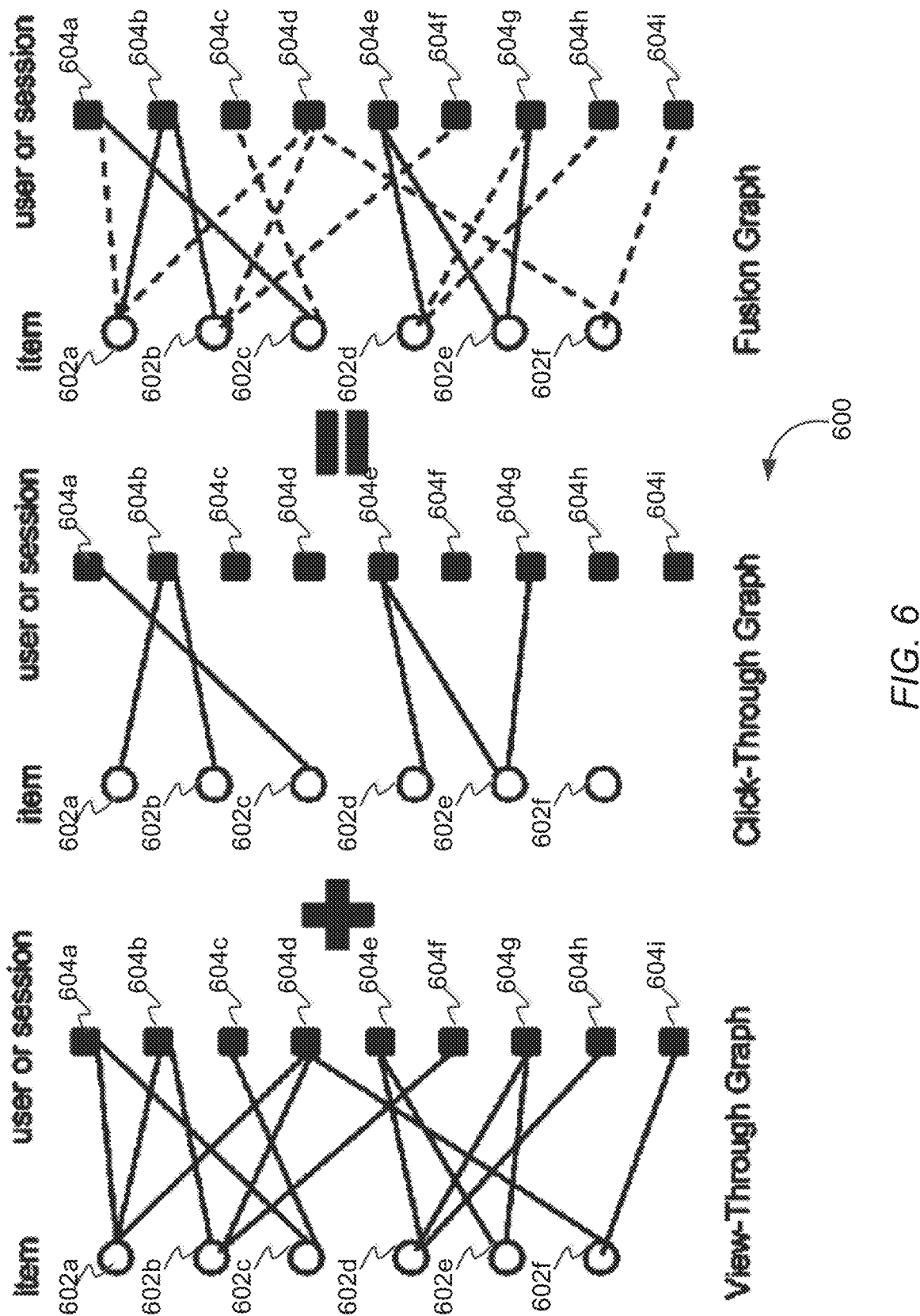
FIG. 6 conceptually illustrates one example of user activity information associated with a set content items.

The user content activity information module 506 may be configured to retrieve or receive user activity information with respect to the given content item(s) and analyze the obtained user activity information. FIG. 6 conceptually illustrates one example of user activity information recording activities in association with various content items observed in some users. As illustrated, the user activity information 600 regarding activities of a set of users 604a-i during viewing the content items 602a-f may include information on different types of user activities. As conceptually shown in FIG. 6, information regarding the first illustrated type of user activity may indicate whether users 602a-f viewed content items 602a-f as illustrated in the first column (from the left) of FIG. 6. In FIG. 6, when a user did view a content item, there is an edge between the content item and the user (in the first column from the left of FIG. 6). For example, the edges emanating from content item 602a indicates that users 604a, 604b, and 604d have viewed the content item 602a. Similarly, edges emanating from item 602b indicate that users 604b, 604d, and 604f have viewed the content item 602b.

Another illustrated type of user activity information is related to click-through activity. In the second column of FIG. 6, it is shown that for each content item, which user have clicked-through the content item. That is, an edge between a content item and a user in the second column of FIG. 6 indicates that the user clicked-through the content during viewing of the content item. For example, the edge connecting content item 602a and user 604b indicates that the user 604b clicked the content item 602a during viewing of the content item 602a. Similarly, the edge connecting content item 602b and user 604e and 604g indicates that both user 604e and 604g have clicked the content item 602b during viewing of the content item 602b.

The user activity information as illustrated in the first and second column from the left of FIG. 6 indicates whether a user viewing a content item has clicked the content item. Such information can be fused together to reveal integrated information. The fused information can be represented by a fusion graph as illustrated in the third column of FIG. 6. The fusion graph may be obtained by analyzing information contained in the first and second columns of FIG. 6. For example, if an edge exists between a content item and a user in both the first and second columns of FIG. 6, it means that the user not only viewed the content item but also clicked-through the content item, evidencing a stronger interest of the user in the content item. In this case, there will be a solid edge between the user and the content item in the fused graph, as illustrated in the fusion graph in FIG. 6 between content item 602a and user 604b. On the other hand, if there is a solid edge between the user and the content item in the first column of FIG. 6 but without an edge in the second column for the same user and content items, it reveals that although the user did review the content item, the user did not click-through the content item. In this case, in the fused graph, there is a dotted edge between the user and the content item, as illustrated between content item 602a and user 604a. It is understood that the user activities that may be captured in the user activity information 600 is not limited to the activities as illustrated in FIG. 6 or engaged by the particular set of user as illustrated. It is also not limited merely to the dimension as illustrated. For example, a session based approach may be employed to capture information related to user activities. In such a session-based approach, activities of all users who are present in a session and whose activities exhibited in the session (e.g., a period of time) may be considered or captured as whole. As an illustration, the total number of clicks on a content item by all users in a session may be considered as the click counts of that content item in the session. Thus, if a number of users viewed a content item but none of them clicked the content item, then there may be a dotted edge between the session and the content item in the third column of FIG. 6. By comparison, if a number of users viewed a content item and some of them (even only one) clicked then content item, then there may be a solid edge between the session and the content item in the third column of FIG. 6.

It should be appreciated that the activity information 600 is not limited to click activities and non-click activities as illustrated in this example. User activity information 600 may include other types of user activities. For example, scrolling activities, typing activities, content interaction activities (e.g., whether the user play a game embedded in content item, did the user achieve an objective of the game, etc.) and/or any other user activities during viewing of the content items may be included in the user activity information 600.

Returning to FIG. 5, the activity based content similarity determination module 510 may be configured to determine similarities between content items based on the user activity information obtained and analyzed by the user content activity information module 506. The operation(s) that may be implemented by the activity based content similarity determination module 510 is conceptually illustrated in FIG. 7.

Figure 7:
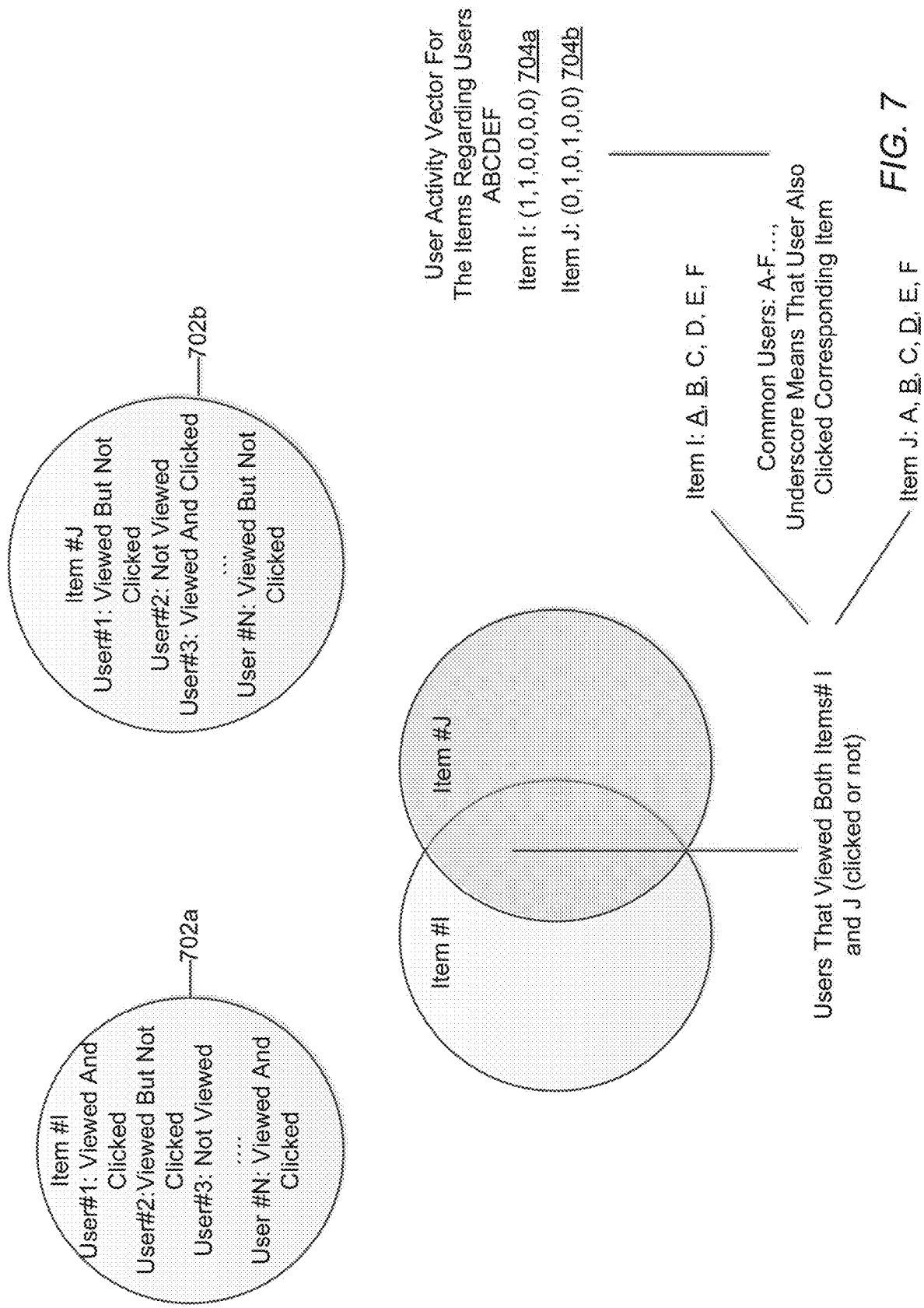
FIG. 7 conceptually illustrates how a similarity between two content items can be determined based on their user activity information, according to an embodiment of the present teaching.

FIG. 7 conceptually illustrates a similarity between two content items may be determined based on user activity information. As shown in the example, user activity information 702a regarding content item # i, for example as obtained and analyzed by the user content activity information module 506, indicates content item # i was viewed by a first set of users, and whether those users have clicked content item # i during viewing of the content item # i. As also shown, user activity information 702b indicates content item # j was viewed by a second set of users, and whether those users have clicked content item # j during viewing of the content item # j. As illustrated, common users in the first set and second set may be obtained. Those common users are the users that have viewed both content item # i and # j. As illustration, suppose those common users may comprise users A, B, C, D, E, F as shown, and their click activities (or lack thereof) during the viewing of both content item # i and # j may be determined. That is, as illustrated, users A and B clicked content item # i when they were viewing it, while users C, D, E, F did not click content item # i when they were viewing it. Similarly, as also shown, users B and D clicked content item # j when they were viewing content item # j, while users A, C, E, F did not click content item # j when they were viewing content item # j. As still illustrated, user activity vectors 704a-b may be generated based on the activity information 702a and 702b. As shown, the user activity vector 704a may be generated such that each component in the user activity vector 704a correspond to a user A, B, C, D, E, and F, in that order, and the components of the vector 704a indicate whether a corresponding user has clicked content item # i. As shown, since users A and B clicked content item # i, and users C, D, E and F did not, the user activity vector 704a is generated as (1, 1, 0, 0, 0, 0) with "1" indicating the corresponding user (i.e., users A and B) clicked content item # i and "0" indicating the corresponding users (i.e., users C, D, E, and F) did not click content item # i when they view the content item # i. Similarly, an activity vector 704b may be generated based on the user activity information 702*b* as illustrated. As will be described below, vectors 704*a-b* may be used to determine a similarity between items # i and # j.

Figure 8:
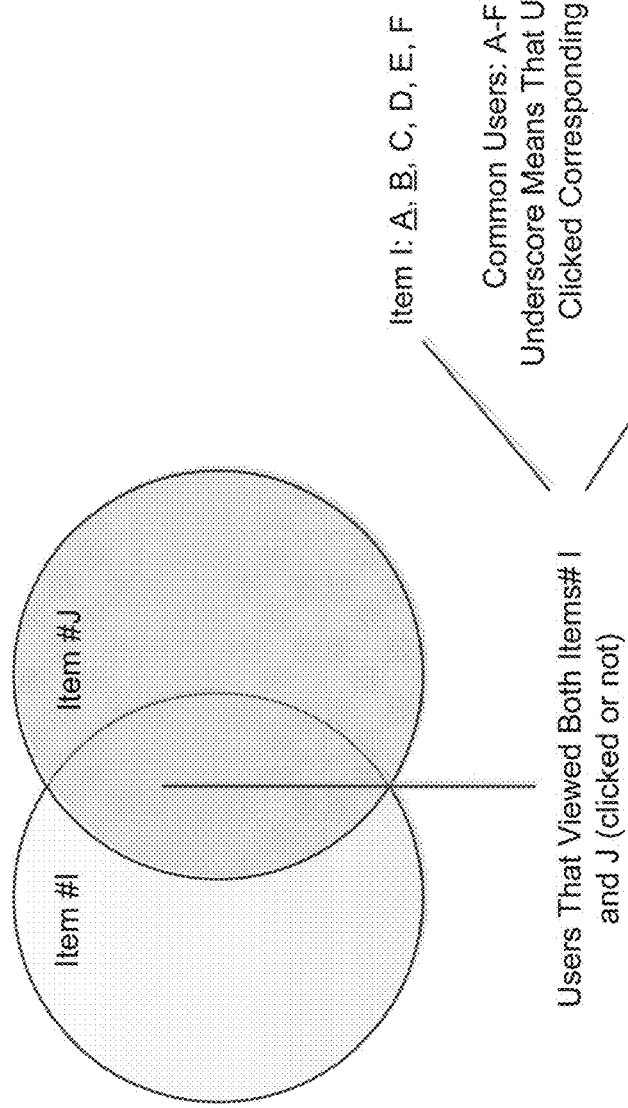
FIG. 8 illustrates another example how a similarity between two content items can be determined based on their user activity information, according to an embodiment of the present teaching.

FIG. 8 illustrates another example of determining a similarity between two content items # i and # j. As shown in this example, weight factor may be assigned to specific user activities when generating the user activity vector. Different user activities during viewing of the content items # i or # j by the users that viewed both content items # i and # j may be differentiated when generating the user activity vectors. For example, user activities such as click activities, non-clicking activities (i.e., viewed but not clicked content item) scroll activities, dwell time activities (time duration spent on a content item or a portion of the content item) may be accorded with different weights. A number of weighting schemes based on types of user activities and as well as specifics of the user activities may be used. For instance, user click activities may be accorded a first weight W1, user scroll activities may be accorded with weight W2, and user non-clicking activities may be accorded with a negative weight (user viewing of the content item but not clicking may indicate a negative feedback reflecting the user is not interested in the content item). In another example, edges shown in FIG. 6 may be weighted independently based on the specifics of a user activity represented by the edge. For instance, as an illustration, a solid edge may be weighted by the dwell time of corresponding users—i.e., the length of viewing time by the corresponding users on the entire content item or portion(s) of the content item. In another example, a solid edge may be weighted by the scroll activities and links or positions of clicking, during the viewing of the content item by the corresponding users.

Figure 9:
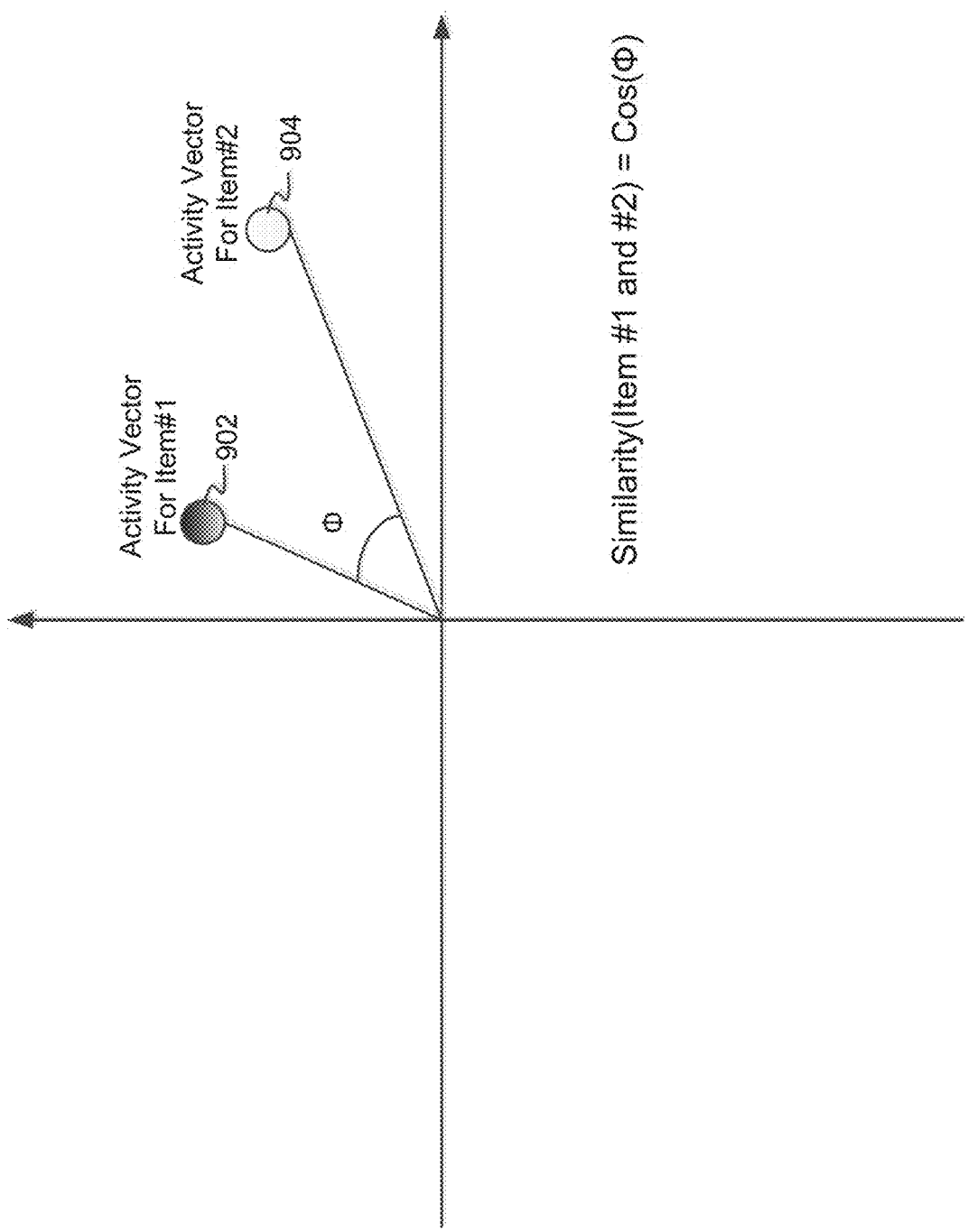
FIG. 9 conceptually illustrates how a similarity between content items may be determined based on user activity vectors associated with the content items, according to an embodiment of the present teaching.

As illustrated, user activity vectors 802*a-b* may be generated based on the weighted value corresponding to individual ones of the user that have viewed both content items # i and # j. As also illustrated, the user activity vectors 802*a-b* may be used to determine a similarity between content items # i and # j. Any known methods may be used to compute the similarity between content items # i and # j based on the user activity vectors 802*a-b*. In this example, two of such methods are illustrated. One approach is to compute the similarity based on the cosine between two vectors. Another exemplary approach is to compute a similarity between two vectors by employing a mutual information function. FIG. 9 conceptually illustrates that a similarity between content items may be determined using user activity vectors associated with content items. As illustrated, a point 902 may correspond to an M dimensional user activity vector regarding content item #1 (e.g., the user activity vector 802*a* shown in FIG. 8). Similarly, a point 904, as illustrated, may correspond to an another M dimensional user activity vector regarding content item #2 (e.g., the user activity vector 802*b* shown in FIG. 8). The similarity between content items #1 and #2 may be determined by computing a cosine of the angle between vector for content item #1 (corresponding to point 902) and vector for content item #2 (corresponding to point 904) in the M dimensional space as shown. In implementations, the cosine-based similarity between content items # i and # j may be computed as follows:

$$Sim(i, j) = CosSim(vector_i, vector_j) = \sum_{k=1}^{N} w_{i,k} * w_{j,k} / \sqrt{\sum_{k=1}^{N} w_{i,k}^2} \sqrt{\sum_{k=1}^{N} w_{j,k}^2},$$

wherein $vector_i$ and $vector_j$ represent user activity vectors associated with the content items # i and # j, respectively, regarding a set of users that viewed both content items # i and # j; and $W_{i,k}$ represents a weighted value of a component k in $vector_i$, the component k corresponding to Kth user in the set of users, and $W_{j,k}$ represents a weighted value of a component k in $vector_j$, $W_{i,k}$ and $W_{j,k}$ indicating the Kth user's activity during viewing content items # i and # j, respectively.

As mentioned, the similarity between content items # i and # j may also be computed based on their respective user activity information using a mutual information function as follows:

Sim (i, j)=I ($X_i$ and $X_j$), wherein $X_i$ and $X_j$ are random variables based on $W_{i,k}$ and $W_{j,k}$, K=1, . . . , N (the observations of $X_i$ and $X_j$), and I denotes a mutual information function that computes the mutual information of variables $X_i$ and $X_j$ Other exemplary methods for computing the activity similarity between content items # i and # j may also be employed and are all within the scope of the present teaching. For example, the similarity between content items # i and # j may be computed using a locality sensitive hashing algorithm (LSH) via a hamming distance, a Euclidean distance, or any type of distance between the user activity vectors associated with content items # i and # j.

Figure 10:
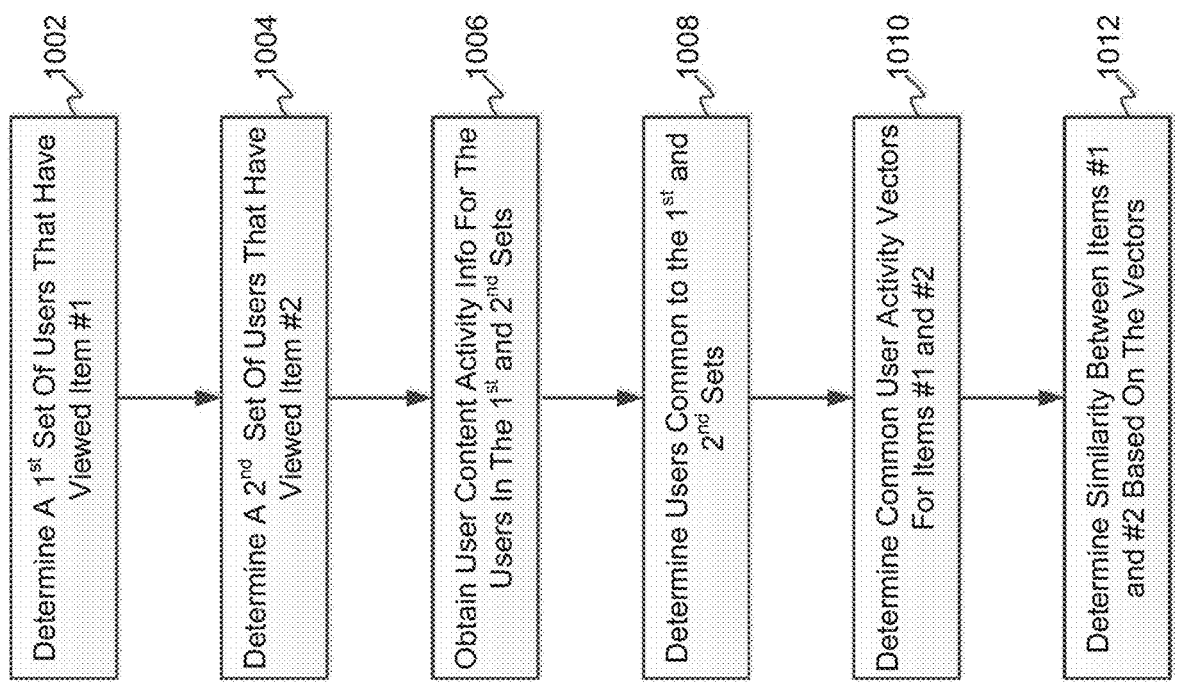
FIG. 10 is a flowchart of an exemplary process for determining a similarity between two content items, according to one embodiment of the present teaching.

FIG. 10 illustrates a flowchart of an exemplary process 1000 for determining a similarity between two content items, according to one embodiment of the present teaching. In some implementations, the process 1000 may be implemented by an activity based content similarity determination module substantially similar to or the same as activity based content similarity determination module 610 as described and illustrated herein. As illustrated, at 1002, a first set of users that have viewed content item #1 may be determined. At 1004, a second set of users that have viewed content item #2 may be determined. At 1006, user activity information regarding the users in the first set when viewing content item #1 may be obtained, and user activity information regarding the user in the second set when viewing content item #2 may be obtained. At 1008, users that viewed both content item #1 and #2 are determined. At 1010, user activity vectors may be generated for content items #1 and #2, indicating user activities during the viewing of the content items may be generated. At 1012, a similarity between content items #1 and #2 may be generated based on the user activity vectors determined at 1008.

Figure 11:
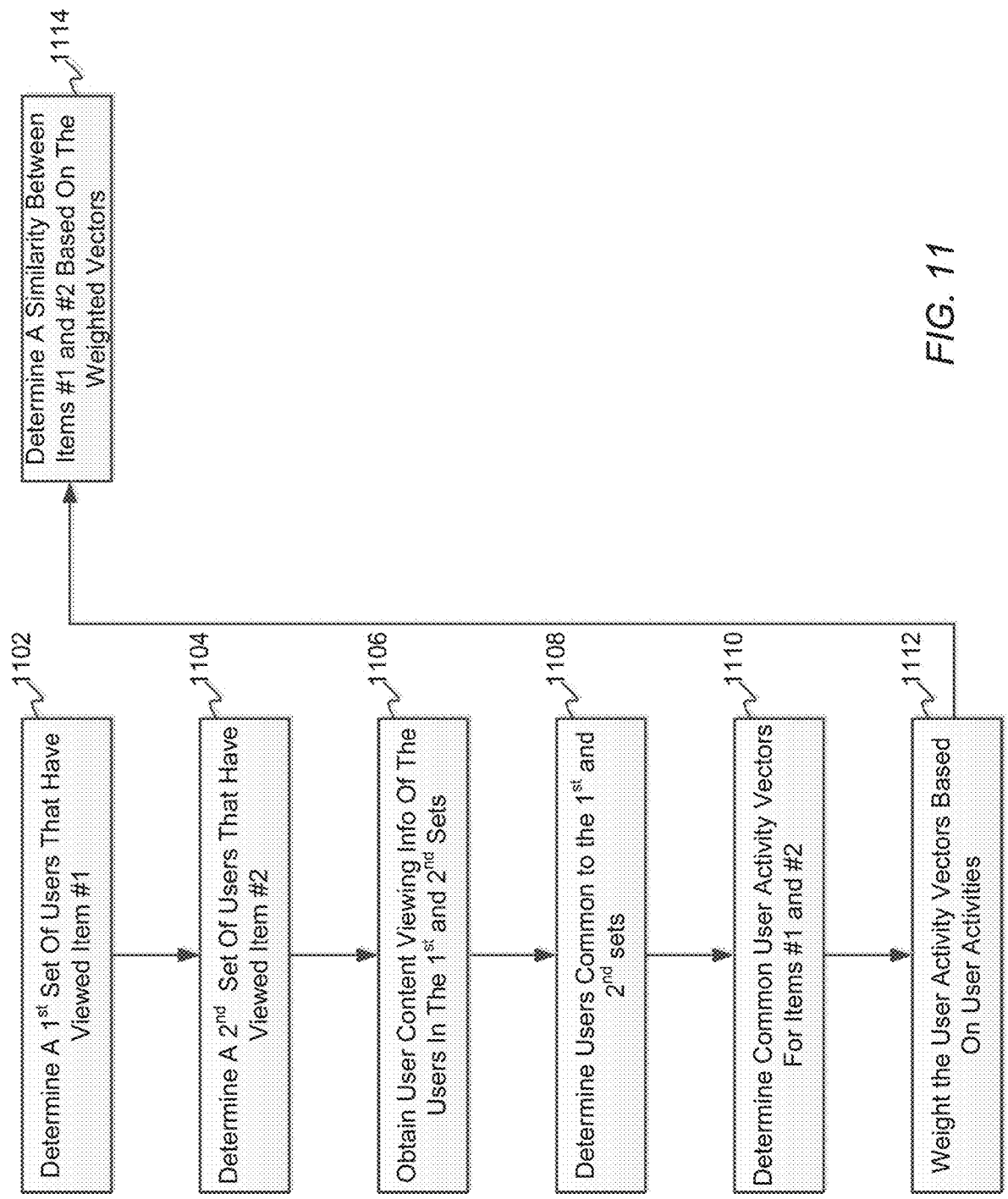
FIG. 11 is a flowchart of another exemplary process for determining a similarity between two content items, according to one embodiment of the present teaching.

FIG. 11 illustrates the flowchart of another exemplary process 1100 for determining a similarity between two content items, according to one embodiment of the present teaching. The difference between FIGS. 10 and 11 is that at 1110 the user activities of the common users during viewing of the content items #1 and #2 may be weighted as described above, and at 1112 the user activity vectors for content items #1 and #2 may be generated based on the user activities weighted at 1110.

Figure 12:
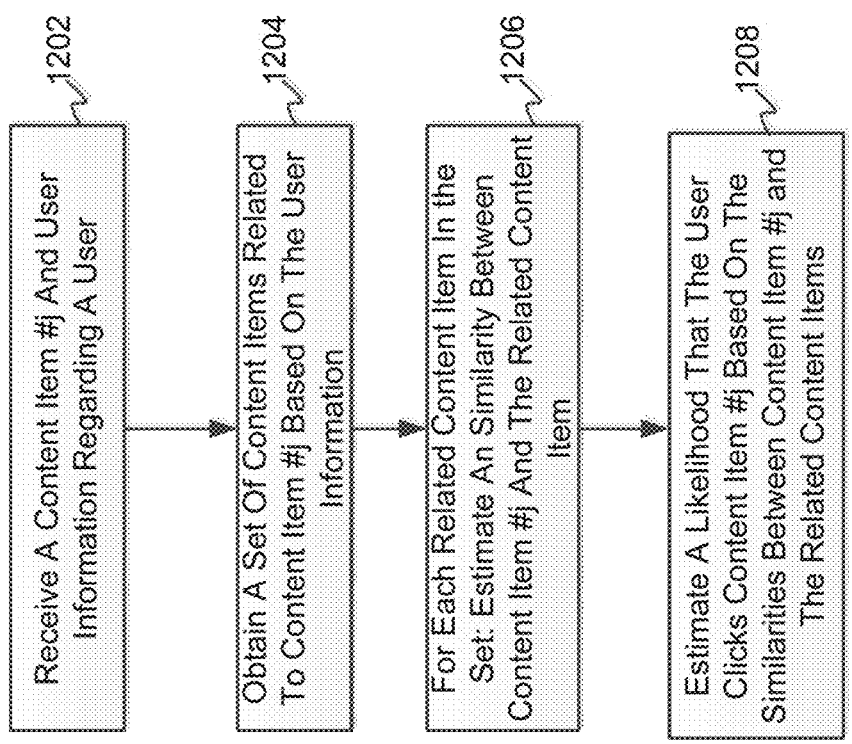
FIG. 12 is a flowchart of an exemplary process for estimating likelihood that a user will click a given content item, according to an embodiment of the present teaching.

Returning to FIG. 5, the content item click probability determination module 508 may be configured to estimate the likelihood that a user clicks a given content item. FIG. 12 illustrates a flowchart of an exemplary process for estimating the likelihood that a user will click a given content item. The exemplary process shown in FIG. 12 may be carried out by a content item click probability determination module substantially similar to or the same as the content item click probability determination module 508 as described and illustrated herein. As illustrated, at 1202, a content item # j and as well as information regarding a user may be received. At 1204, a set of content items related to content item # j may be determined based on the user information received at 1202. This set of related content items may include content items that were viewed by the user during the same session as content item # j, content items related to content item # j based on relevance in accordance with a user profile of the user and were viewed by the user in previous session(s), content items that were specified (e.g., by a provider, administrator, moderator, and/or any other entities related to the system 100) as being related to content item # j (e.g., based on a user type of the user and were viewed by the user in previous session(s)), and/or any other content items being considered related to content item # j in accordance with any other criterion. At 1206, for each content item in the set determined at 1204, a similarity between the content item in the set and content item # j may be determined. The similarities determined at 1206 may be expressed as $(I_{s1}, I_{s2}, \ldots I_{sN})$, wherein $I_{sN}$ denotes the similarity between Nth related content item in the set and content item # j. At 1208, the likelihood that the user will click content item # j may be computed based on the similarities determined at 1206. Any known methods may be employed to compute this likelihood. For example, the likelihood that the user will click content item # j may be computed using the following formula:

$$score = \frac{\sum_{i' \in I} s_{i'} act_{i'}}{\sum_{i' \in I} s_{i'}}$$

wherein $act_i$ denotes whether the ith related content item in the set was clicked by the user (e.g., the value of act may be either 0 or 1), $S_i$ denotes the similarity between content item # j and the ith related content item, and Score denotes the computed click probability of content item # j by the user. Another example of computing the likelihood of the user clicking content item # j may be computed as follows:

$$score = \frac{\sum_{i' \in I} s_{i'} act_{i'} + \lambda \cdot ctr}{\sum_{i' \in I} s_{i'} + \lambda}$$

wherein $\lambda$ denotes a scale factor and ctr denotes the historical click through rate of content item # j. Still in another example, the click probability may be computed as follows:

$$score = \frac{\sum_{i' \in I} s_{i'} act_{i'} /|I| + \lambda \cdot ctr}{\sum_{i' \in I} s_{i'} /|I| + \lambda}$$

wherein |I| denotes the cardinality.

Referring back to FIG. 1, the unified ranking unit 102 as illustrated may be configured to receive a first set of candidate content items as generated by the user-profile based candidate content selection unit 106 and a second set of candidate content items as generated by the user-activity based candidate content selection unit 104. The unified ranking unit 102 may be configured to rank the candidate content items from both sources. The ranking may be carried out in accordance with a learning model derived via the machine learning engine 108.

Figure 13:
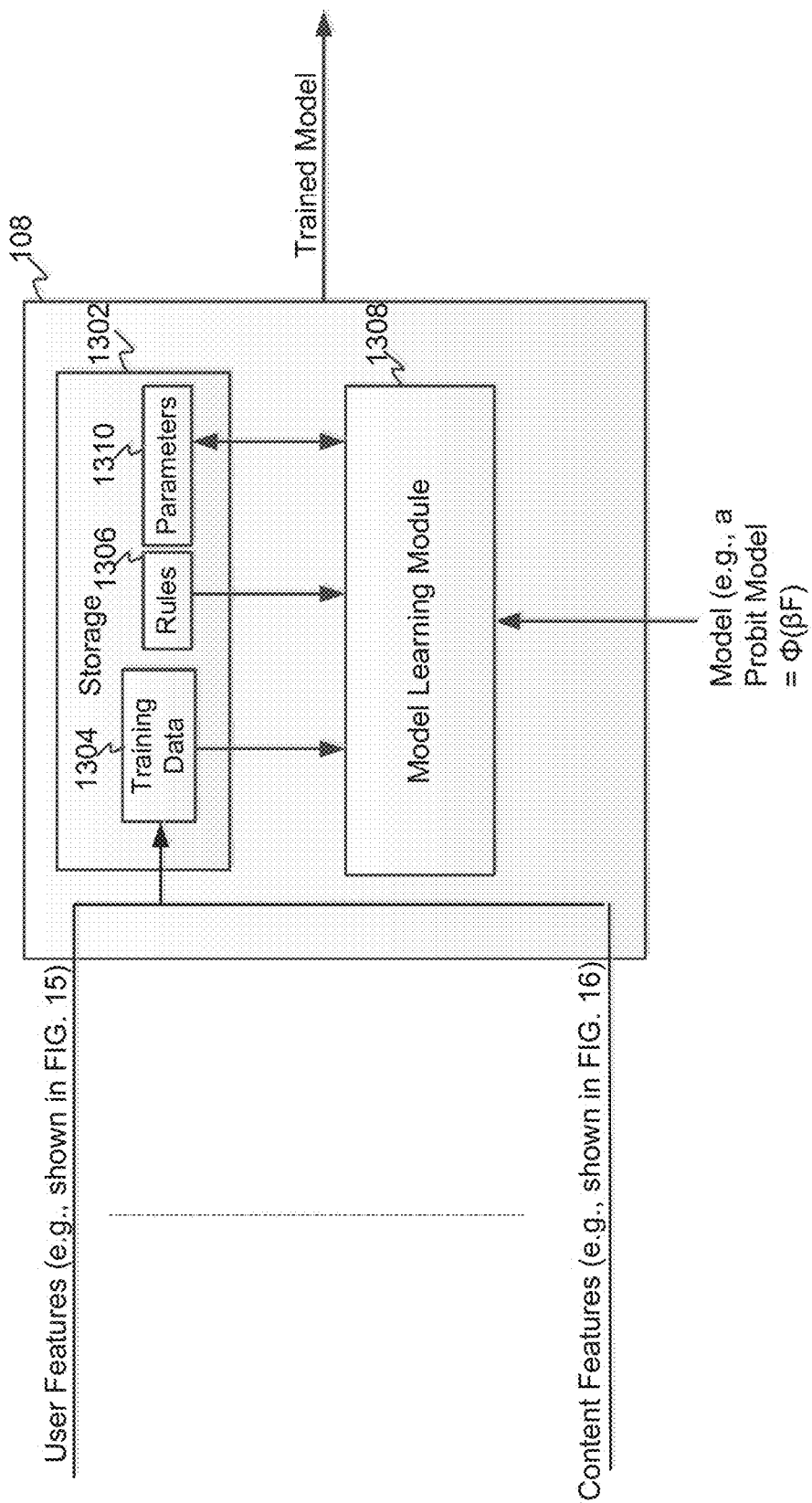
FIG. 13 is an exemplary system diagram of a machine learning engine shown in FIG. 1, according to an embodiment of the present teaching.
Figure 14:
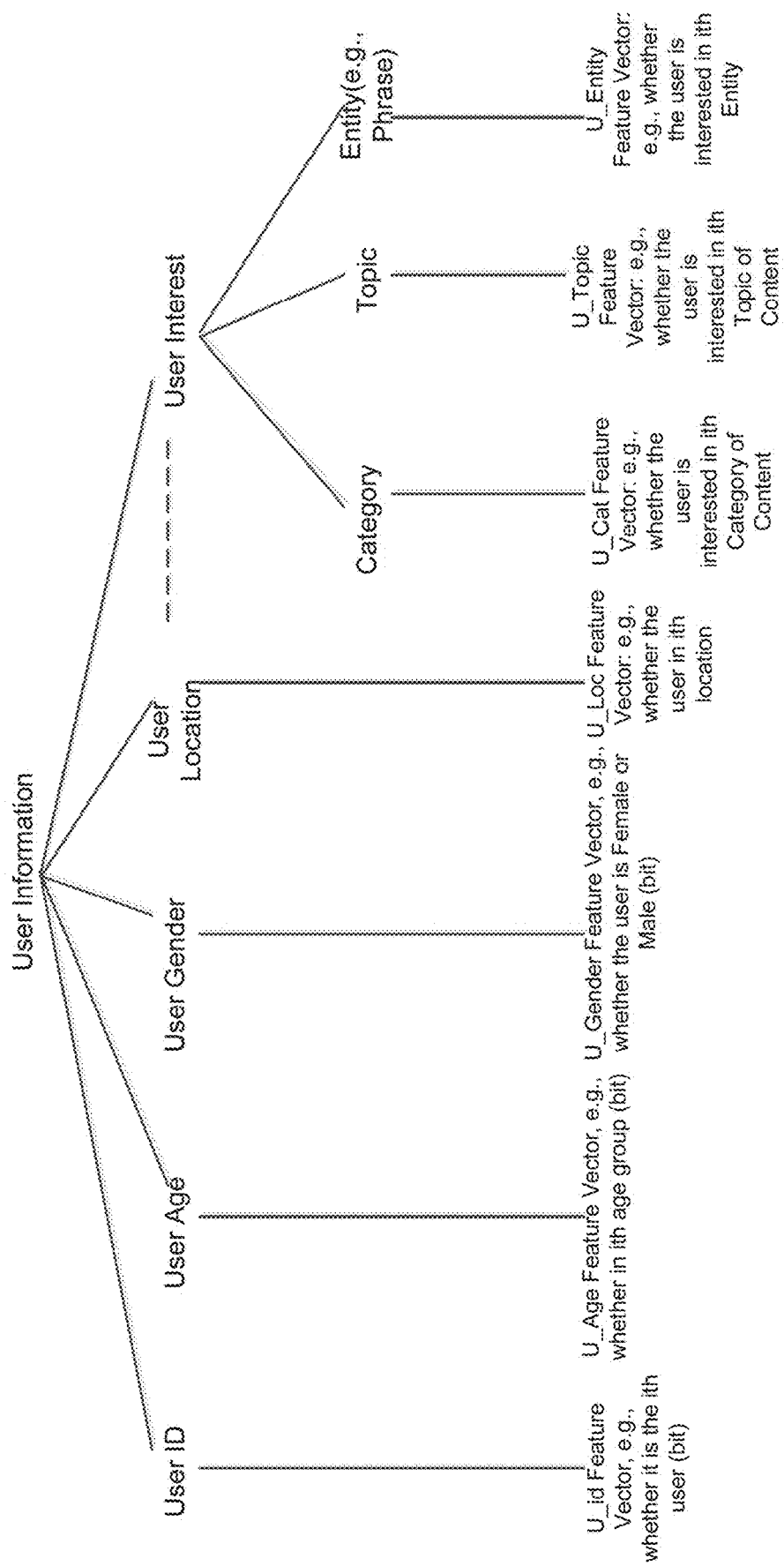
FIG. 14 illustrates examples of user side features that may be used to train a learning model.
Figure 15:
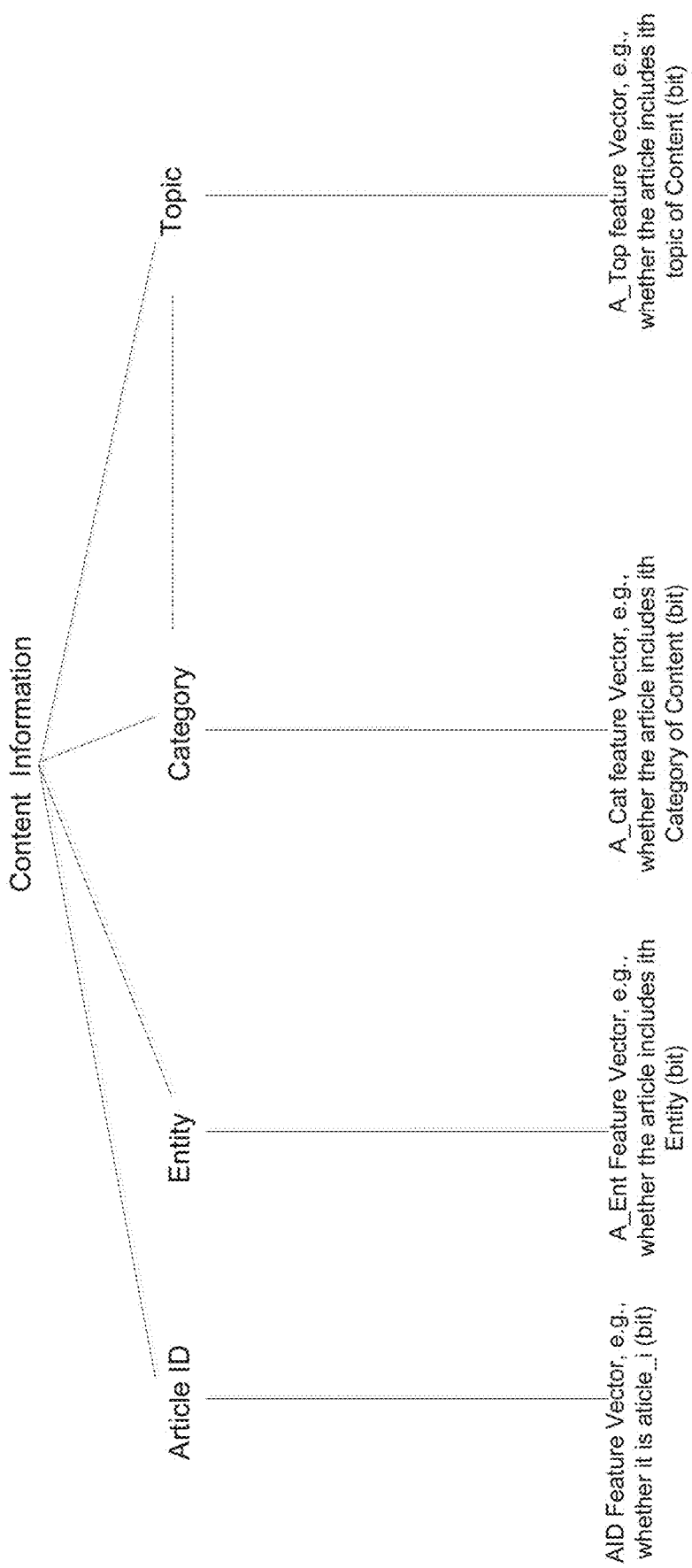
FIG. 15 illustrates examples of content side features that may be used to train a learning model.

FIG. 13 is an exemplary diagram of the machine learning engine 108 shown in FIG. 1, according to one embodiment of the present teaching. As illustrated herein, the machine learning engine 108 may be configured to include storage 1302, a model learning module 1308, and/or any other modules. The storage 1302 may include data storage 1304 for temporally or permanently storing training data received by the machine learning engine 108. In some implementations, the training data 1304 may be received by the machine learning engine 108 offline. In some embodiments, the training data 1304 may include features related to users, features related to content items, user-content cross features, and/or any other features that may be deemed useful in machine learning. FIG. 14 provides some exemplary types of features related to users. FIG. 15 provide a exemplary types of features related to content items.

The model learning module 1308 may be configured to receive the training data, information deemed relevant to a learning model to be trained, and/or parameters to be employed in training the learning model based on the training data. Such training data may reveal much information related to user's interests in content items and is utilized by the present teaching to train a learning model to be used to rank candidate content items. Training data may include user information such as demographics, declared interests, past interests in content items, etc. Training data may also include content information such as classification of content items. Training data may also include event information such as actions users performed on certain content items.

Features vectors may be generated based on received training data. For example, based on user information as illustrated in FIG. 14, user feature vectors may be generated. Another type of feature vectors may be generated based on information regarding content items, as illustrated in FIG. 15. User information and content information may be cross referenced so that feature vectors may be constructed indicating the user-content cross features. For example, with respect to a user and a content item, whether the user is interested in one or more topics included in the content item may be utilized to construct a user-content cross feature vector, via user activities. If the user clicks a content item having a particular labeled topic, this activity may be converted to a "1" attribute value in a user-content cross feature vector for the feature corresponding to the topic. For each such a user activity, a corresponding user-content cross feature vector may be fed into the model learning module 1308 to derive or update a model capturing the preferences of users in content items.

During the training, the model learning module 1308 may use rules configured in the system and stored in storage 1306. Such rules and/or the parameters to be used in training a learning model may vary with the learning model adopted. In some embodiments, to train a learning model, the model learning module 1308 may generate feature vectors first based on the training data. As discussed above, user information may be used by the model learning module 1308 to generate a multiple dimensional feature vector based on various characteristics of the user, e.g., as shown in FIG. 14. For instance, each dimension may be related to a particular user characteristic such as user demographics or user interests. For each dimension, the model learning module 1308 may construct a feature vector. For example, given a user's age, the model learning module 1308 may construct a user age vector based on a user's manifested age by assigning the user to one of multiple (10) age groups, e.g., age groups corresponding to age ranges of 0-10, 10-20, 20-30, 30-40, 40-50, 50-60, 60-70, 70-80, 80-90, 90-100. As an illustration, assume that an age feature vector is constructed based on the above group of 10 age ranges. If a user's age is 15, the machine learning module 1308 may populate the age feature vector for the user as, e.g., (0,1,0,0,0,0,0,0,0,0), indicative of the age group that the user belongs to. Based on user information, multiple feature vectors may be constructed. The user interests feature vector may be constructed with respect to category and/or topics of interests based on, e.g., some taxonomy. Such feature vectors map a user into a high dimensional space as a point. Users with similar features will be mapped to points in the high dimensional space with close distances and, hence, indicating that they share similar characteristics. Each such mapped point may be identified based on the identification information of the underlying user.

Similarly, feature vectors associated with content items may also be constructed for learning purposes. For example, a feature vector related to categories and/or topics of a content item may be constructed. Different topics/categories may be pre-classified into different coded groups. Each content item may have identifiers that indicate the category/topic group(s) that the content item is classified into. To characterize a content item in terms of content category/topic, a feature vector with all possible categories/topics may be constructed with, e.g., each feature value being 1 (belonging to the category/topic) or 0 (not belonging to the category/topic). With respect to each content item, its corresponding feature vector is then constructed to have, e.g., "1"s on attributes representing categories/topics that the content item belongs to and "0"s on attributes representing categories/topics that the content item does not belong to. Feature vectors for other characteristics of a content item may also be constructed. That is, for each content item, more than one feature vectors may be constructed and in combination, it maps a content item into a multiple dimensional space as a point. Each point mapped to the content space may be identified based on the identification of the content items. Points mapped close to each other in this content item space indicate that they share certain common or close characteristics.

Another exemplary type of feature vector that the model learning module 1308 may utilize, as discussed above, is user-content cross feature vector. Based on received information on a user and content items associated with the user, the model learning module 1308 may construct an integrated feature space that combine the user features with content features. For each user, it may be combined with different content items to generate different feature points in the user-content space. A user-content cross feature vector may also be generated by the model learning module 1308 based on each given situation involving a user and a content item. For example, a user-content cross feature vector may be constructed based on different combinations of {user_id, user_feature} and {content_id, content_features} so that the user-content cross feature vector may be constructed based on different ranges of those feature value combinations. In this case, depending on a specific user and a given content item, the model learning module 1308 may generate a user-content cross feature vector by assigning a "1" for the user-content feature range appropriate for the given situation and assigning "0"s for all other ranges. For example, if a user is in the age group of 30-40 corresponding to #4 age group and the given content item has a content topic falling in the #13 content category/topic. Such a user-content cross feature vector generated by the model learning module 1308 corresponds to a point in the user-content space. Points having a close distance in this user-content space may signify that those users share some common interests in content of certain topics.

Once the training data points have been mapped to the feature space(s) (user space where users are mapped to via user related feature vectors, content space in which content items are mapped to via content related feature vectors, and user-content space in which user-content cross feature vectors are mapped), the model learning module 1308 carries out the learning using such training data based on rules associated with the learning model to be trained, as well the parameters in connection with the learning model to be trained. As all the training data points have been mapped to the feature space, what may be learned include which users share similar interests and on what topics, content items, etc. What may also be learned may include what content items have caused more active involvement of the users who do or do not share similar interests. Such knowledge is learned by the model learning module 1308 and embedded in the learning model to be trained. Ultimately, the model learning module 1308 may identify how the training data is clustered in the high dimensional space and how the points clustered together may be related to each other and in what manner as well as how data distributed in different clusters may be distinguished based on what features. Such knowledge is captured in the learning process via the learning model and parameters associated therewith so that the learned models can be utilized, in the future, to determine what appropriate content items are to be selected for which user.

Below, a probabilistic model and learning scheme is disclosed herein. It should be appreciated, however, that any suitable model may be trained by model learning module 1308. In addition, any learning model may be adopted to learn the relationship between user information and content information via the linkage established via user activities. One exemplary model for learning is a probabilistic model, as illustrated below:

$Pr(Click|F)=\Phi(\beta F)$, where F is feature vectors (e.g., user feature vector, content feature vector, user-content feature vector) translated from user content viewing events and $\beta$ is the weighting parameter. $\Phi$ is the CDF of the standard normal distribution.

As shown, the probabilistic model may be trained using feature vectors generated based on, e.g., user information, content information, as well as information about user-content interactions. That is, every time a user content viewing event occurs, information about the event may be converted into feature vector(s) as described above, and used by the model learning module 1308 to update a current probabilistic model, e.g., with respect to the weights and/or parameters of the underlying model employed. Such modified (updated) model may then be stored and used in the future in subsequent content rankings and/or selections. In this way, a model may be trained in an expectation propagation manner using message passing technique in a factor graph.

Figure 16:
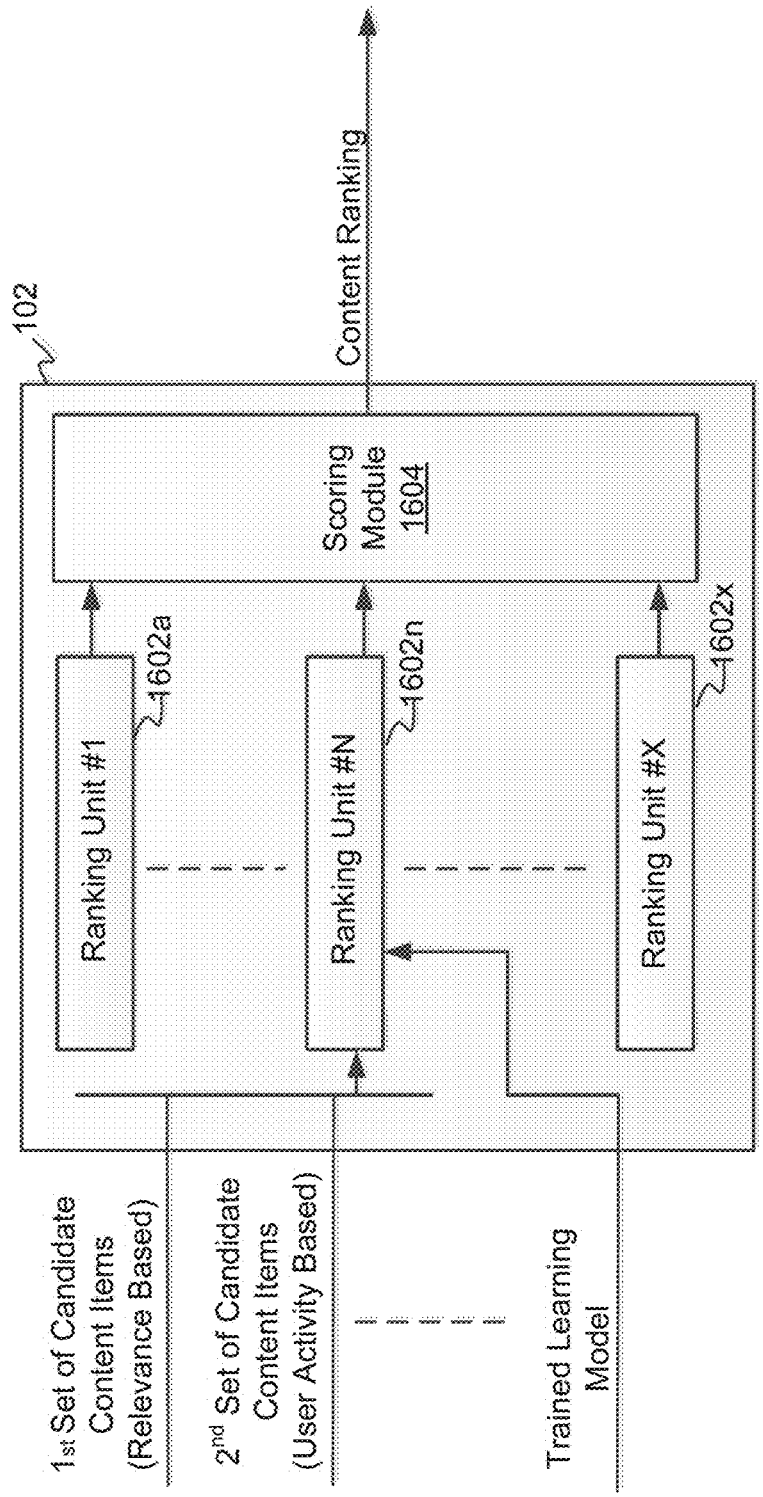
FIG. 16 illustrates an exemplary system diagram of the unified ranking unit shown in FIG. 1, according to one embodiment of the present teaching.

FIG. 16 illustrates an exemplary system diagram showing the unified ranking unit 102 shown in FIG. 1. In this illustrated example, the unified ranking unit 102 may comprise multiple ranking units—i.e., ranking units 1602a, 1602n, 1602x, each of which may be configured to independently to rank content items. For example, a ranking unit, e.g., 1602a, may be configured to rank content items based on their popularity in a predetermined period. The unified ranking unit 102 may also include a ranking unit, such as ranking unit 1602n, to rank the candidate content items from the first and second candidate content sets, generated based on user profile and user activities, respectively, based on trained learning models. For example, given a trained probabilistic model and the inputs related to a specific user and candidate content items (in both first and second sets), the candidate content items can be ranked using the probabilistic model by computing, for each candidate content item, the probability that the given user will click on the candidate content item. The higher the probability, the high the rank of the candidate content item.

As illustrated above, one example of the model trained by the machine learning engine 108 may include a probabilistic model, which may be used to rank a given candidate content item by estimating a probability of clicking the given content item using $Pr(Click|F)=\Phi(\beta F)$, wherein F denotes features vectors (e.g., user feature vectors, content feature vectors, user-content cross feature vectors, and/or any other feature vectors) generated based on a given content item to be ranked for a user, and $Pr(click|F)$ denotes a probability of the user clicking the given content item as identified by these feature vectors.

As still shown in FIG. 16, the rankings of candidate content items determined by various ranking units 1602 may be sent to the scoring module 1604 for generating an integrated ranking score based on the rankings of the candidate content items from various ranking units 1602a, . . . , 1602n, . . . 1602x. In some embodiments, the scoring module 1604 may employ certain approach to combine the rankings from different ranking units. For example, a weighted sum may be adopted, in which the weights may be applied to the ranking results from different ranking units and such weights may be determined a priori (based on pre-determined preferences of each ranking unit) or learned via, e.g., feedback information. The result from the scoring module 1604 may provide an order to the candidate content items sequenced based on their ranking scores. For example, the order can be an ascending order so that the candidate content items with the highest ranking appears first and the candidate content items with lower rankings following that with higher rankings Such an order may be used as the order in which the candidate content items are presented to the user so that the content items that have a high likelihood to be clicked by the user are presented first to improve the possibility that the recommended content meets the interests of the user, determined based on both the user profile as well as the user activities.

Figure 17:
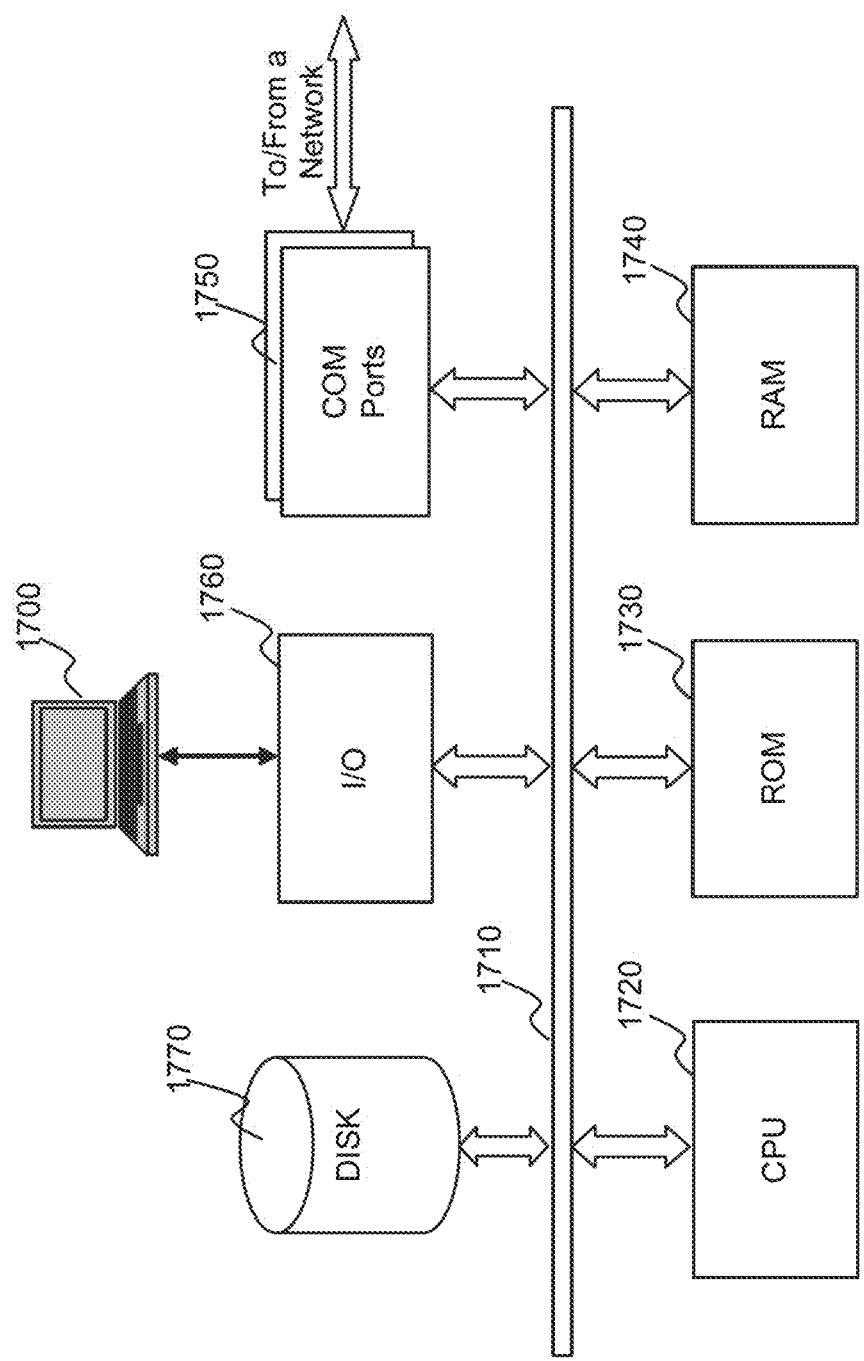
FIG. 17 depicts the architecture of a mobile device which can be used to implement a specialized system incorporating the present teaching.

FIG. 17 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1700 may be used to implement any component of the enhanced content recommendation techniques, as described herein. For example, the personalized content recommendation module 100, etc., may be implemented on a computer such as computer 1700, via its hardware, software program, firmware, or a combination thereof. Although only one such computer is shown, for convenience, the computer functions relating to the personalized content recommendation module 100 may be implemented in a distributed fashion on a number of similar platforms, to distribute the processing load.

The computer 1700, for example, includes COM ports 1750 connected to and from a network connected thereto to facilitate data communications. The computer 1700 also includes a central processing unit (CPU) 1720, in the form of one or more processors, for executing program instructions. The exemplary computer platform includes an internal communication bus 1710, program storage and data storage of different forms, e.g., disk 1770, read only memory (ROM) 1730, or random access memory (RAM) 1740, for various data files to be processed and/or communicated by the computer, as well as possibly program instructions to be executed by the CPU. The computer 1700 also includes an I/O component 1760, supporting input/output flows between the computer and other components therein such as user interface elements 1780. The computer 1700 may also receive programming and data via network communications.

To implement various modules, units, and their functionalities described in the present disclosure, computer hardware platforms may be used as the hardware platform(s) for one or more of the elements described herein (e.g., personalized content recommendation module 210, and/or other components of system 100 described herein). The hardware elements, operating systems and programming languages of such computers are conventional in nature, and it is presumed that those skilled in the art are adequately familiar therewith to adapt those technologies to enhance personalized content recommendation described herein. A computer with user interface elements may be used to implement a personal computer (PC) or other input of work station or terminal device, although a computer may also act as a server if appropriately programmed. It is believed that those skilled in the art are familiar with the structure, programming and general operation of such computer equipment and as a result the drawings should be self-explanatory.

Figure 18:
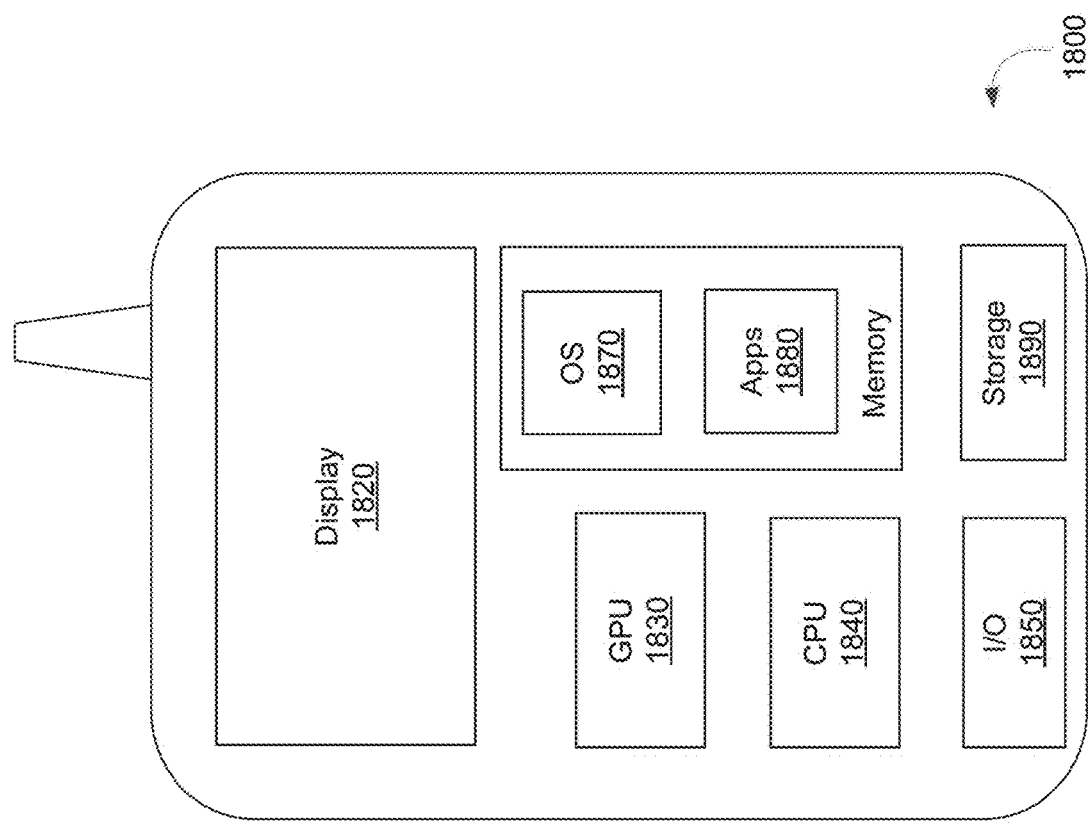
FIG. 18 depicts the architecture of a computer which can be used to implement a specialized system incorporating the present teaching.

FIG. 18 depicts the architecture of a mobile device which can be used to realize a specialized system implementing the present teaching. In this example, the user device on which content and advertisement are presented and interacted-with is a mobile device 1800, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1800 in this example includes one or more central processing units (CPUs) 1840, one or more graphic processing units (GPUs) 1830, a display 1818, a memory 1860, a communication platform 1810, such as a wireless communication module, storage 1890, and one or more input/output (I/O) devices 1850. Any other suitable component, including but not limited to a system bus or a controller (not shown), may also be included in the mobile device 1800. As shown in FIG. 18, a mobile operating system 1870, e.g., iOS, Android, Windows Phone, etc., and one or more applications 1880 may be loaded into the memory 1860 from the storage 1890 in order to be executed by the CPU 1840. The applications 1880 may include a browser or any other suitable mobile apps for receiving and rendering content streams and advertisements on the mobile device 1800. User interactions with the content streams may be achieved via the I/O devices 1850 and provided to personalized content recommendation module 100, and/or other components of system 10, Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a input of machine readable medium. Tangible non-transitory "storage" input media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of personalized content recommendation module 100 into the hardware platform(s) of a computing environment or other system implementing a computing environment or similar functionalities in connection with personalized content recommendation module 100. Thus, another input of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced personalized content recommendation disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network, for recommending, to a user, content items, the method comprising:
   obtaining a user profile comprising features of content items that have been viewed by the user;
   generating a first set of candidate content items based on the user profile by:
      comparing, for each feature, a number of times the user viewed content items associated with the feature to an average number of times content items associated with the feature was viewed by other users, and
      selecting one or more content items to be included in the first set of candidate content items based on the comparison;
   generating a second set of candidate content items, wherein each of the candidate content items of the second set is similar to the one or more content items, wherein a similarity is computed based on a plurality of activities performed by other users with respect to the candidate content item and the one or more content items, the generating further comprising:
      obtaining, for each of the plurality of activities, a candidate activity vector representing the activity of other users with respect to the candidate content item,
      obtaining, for each of the plurality of activities, a content activity vector representing the activity of other users with respect to the one or more content items,
      generating a first integrated vector based on the candidate activity vectors and a second integrated vector based on the content activity vectors, and
      incorporating the candidate content item in the second set based on a criterion associated with the first integrated vector and the second integrated vector;
   ranking each of the candidate content items in the first and second sets using a learning model, which is trained with at least one of user feature information, content feature information and user-content cross feature information; and
   providing, based on the ranking, the candidate content items in the first and second sets as content recommendations to the user.

2. The method of claim 1, further comprising estimating a likelihood that the user interacts with each of the candidate content items of the second set by:
   aggregating the similarities between the candidate content item and the one or more content items, wherein the one or more content items is a plurality; and including the candidate content item in the second set of candidate content items if the likelihood exceeds a certain threshold.

3. The method of claim 1, wherein the previous interaction includes at least one of clicking, typing, forwarding, and/or scrolling.

4. The method of claim 1, wherein the similarity is computed based on at least one of a cosine function, a mutual information algorithm, and a locality sensitive hashing (LSH) algorithm.

5. The method of claim 1, further comprising:
assigning weights to each of the plurality of activities; and
updating, based on the assigning, the first integrated vector and the second integrated vector, a negative weight being associated with non-clicking interaction activity.

6. The method of claim 1, wherein the user has not previously viewed any of the candidate content items of the second set.

7. A system, implemented on a machine having at least one processor, storage, and a communication platform connected to a network, for recommending, to a user, content items, the system comprising:
a user-profile based candidate content selection unit configured to:
obtain a user profile comprising features of content items that have been viewed by the user, and
generate a first set of candidate content items based on the user profile by comparing, for each feature, a number of times the user viewed content items associated with the feature to an average number of times content items associated with the feature was viewed by other users and by selecting one or more content items to be included in the first set of candidate content items based on the comparison;
a user-activity based candidate content selection unit configured to:
generate a second set of candidate content items, wherein each of the candidate content items of the second set is similar to the one or more content items, wherein a similarity is computed based on a plurality of activities performed by other users with respect to the candidate content item and the one or more content items, the user-activity based candidate content selection unit being further configured to:
obtain, for each of the plurality of activities, a candidate activity vector representing the activity of other users with respect to the candidate content item,
obtain, for each of the plurality of activities, a content activity vector representing the activity of other users with respect to the one or more content items,
generate a first integrated vector based on the candidate activity vectors and a second integrated vector based on the content activity vectors, and
incorporate the candidate content item in the second set based on a criterion associated with the first integrated vector and the second integrated vector; and
a unified ranking unit configured to
rank each of the candidate content items in the first and second sets using a learning model, which is trained with at least one of user feature information, content feature information and user-content cross feature information, and
provide, based on the ranking, the candidate content items in the first and second sets as content recommendations to the user.

8. The system of claim 7, wherein the user-activity based candidate content selection unit is configured to estimate a likelihood that the user interacts with each of the candidate content items of the second set by:
aggregating the similarities between the candidate content item and the one or more content items, wherein the one or more content items is a plurality; and
including the candidate content item in the second set of candidate content items if the likelihood exceeds a certain threshold.

9. The system of claim 7, wherein the previous interaction includes at least one of clicking, typing, forwarding, and/or scrolling.

10. The system of claim 7, wherein the similarity is computed based on at least one of a cosine function, a mutual information algorithm, and a locality sensitive hashing (LSH) algorithm.

11. A machine-readable tangible and non-transitory medium having information for recommending, to a user, content items, wherein the information, when read by the machine, causes the machine to perform the following:
obtaining a user profile comprising features of content items that have been viewed by the user;
generating a first set of candidate content items based on the user profile by:
comparing, for each feature, a number of times the user viewed content items associated with the feature to an average number of times content items associated with the feature was viewed by other users, and
selecting one or more content items to be included in the first set of candidate content items based on the comparison;
generating a second set of candidate content items, wherein each of the candidate content items of the second set is similar to the one or more content items, wherein a similarity is computed based on a plurality of activities performed by other users with respect to the candidate content item and the one or more content items, the generating further comprising:
obtaining, for each of the plurality of activities, a candidate activity vector representing the activity of other users with respect to the candidate content item,
obtaining, for each of the plurality of activities, a content activity vector representing the activity of other users with respect to the one or more content items,
generating a first integrated vector based on the candidate activity vectors and a second integrated vector based on the content activity vectors, and
incorporating the candidate content item in the second set based on a criterion associated with the first integrated vector and the second integrated vector;
ranking each of the candidate content items in the first and second sets using a learning model, which is trained with at least one of user feature information, content feature information and user-content cross feature information; and
providing, based on the ranking, the candidate content items in the first and second sets as content recommendations to the user.

12. The machine-readable and non-transitory medium of claim 11, wherein the machine is further caused to estimate a likelihood that the user interacts with each of the candidate content items of the second set by:

aggregating the similarities between the candidate content item and the one or more content items, wherein the one or more content items is a plurality; and including the candidate content item in the second set of candidate content items if the likelihood exceeds a certain threshold.

13. The machine-readable and non-transitory medium of claim 11, wherein the previous interaction includes at least one of clicking, typing, forwarding, and/or scrolling.

* * * * *